(12) United States Patent
Gruhlke et al.

(10) Patent No.: US 8,872,085 B2
(45) Date of Patent: *Oct. 28, 2014

(54) DISPLAY DEVICE HAVING FRONT ILLUMINATOR WITH TURNING FEATURES

(75) Inventors: Russell Wayne Gruhlke, Milpitas, CA (US); Brian James Gally, Los Gatos, CA (US); Marek Mienko, San Jose, CA (US); Ion Bita, San Jose, CA (US); Gang Xu, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1384 days.

This patent is subject to a terminal disclaimer.

(21) Appl. No.: 12/444,138

(22) PCT Filed: Sep. 26, 2007

(86) PCT No.: PCT/US2007/020736
§ 371 (c)(1), (2), (4) Date: Jan. 11, 2010

(87) PCT Pub. No.: WO2008/045207
PCT Pub. Date: Apr. 17, 2008

(65) Prior Publication Data
US 2010/0141557 A1    Jun. 10, 2010

Related U.S. Application Data

(60) Provisional application No. 60/850,025, filed on Oct. 6, 2006.

(51) Int. Cl.
*H01L 27/00* (2006.01)
*F21V 8/00* (2006.01)
*G02B 26/00* (2006.01)

(52) U.S. Cl.
CPC ............ *G02B 6/0051* (2013.01); *G02B 6/0053* (2013.01); *G02B 26/001* (2013.01)
USPC ....................................... 250/208.1; 250/239

(58) Field of Classification Search
USPC ........... 250/208.1, 216, 239; 385/133, 15, 11, 385/12; 359/237, 290–296, 223, 243; 345/50–54, 85, 204, 501; 362/607–623
See application file for complete search history.

(56) References Cited

U.S. PATENT DOCUMENTS 2,518,647 A    8/1950   Teeple et al.
2,534,846 A   12/1950   Ambrose et al.
(Continued)

FOREIGN PATENT DOCUMENTS

CA    2490975 A1    1/2004
CN    1158182 A     8/1997
(Continued)

OTHER PUBLICATIONS

International Search Report and Written Opinion for PCT/US2007/020736 dated Jul. 14, 2008.
(Continued)

*Primary Examiner* — Que T Le
(74) *Attorney, Agent, or Firm* — Knobbe, Martens, Olson & Bear LLP

(57) ABSTRACT

In various embodiments described herein, a display device includes a front illumination device that comprises a light guide disposed forward of an array of display elements, such as an array of interferometric modulators, to distribute light across the array of display elements. The light guide panel may include a turning layer to deliver uniform illumination from a light source to the array of display elements. For many portable display applications, the light guide panel comprises the substrate used in fabricating the display elements. The light guide panel may include additional films as well. The light guide panel, for example, may include a diffuser and/or an optical isolation layer to further enhance the optical imaging characteristics of the display.

23 Claims, 11 Drawing Sheets

(56) References Cited

U.S. PATENT DOCUMENTS

| | | |
|---|---|---|
| 2,677,714 A | 5/1954 | Auwarter |
| 3,247,392 A | 4/1966 | Thelen |
| 3,439,973 A | 4/1969 | Bernt et al. |
| 3,443,854 A | 5/1969 | Weiss |
| 3,448,334 A | 6/1969 | Frost |
| 3,653,741 A | 4/1972 | Marks |
| 3,656,836 A | 4/1972 | Baudoin et al. |
| 3,679,313 A | 7/1972 | Rosenberg |
| 3,725,868 A | 4/1973 | Malmer et al. |
| 3,813,265 A | 5/1974 | Us |
| 3,886,310 A | 5/1975 | Guldberg et al. |
| 3,924,929 A | 12/1975 | Holmen et al. |
| 3,955,880 A | 5/1976 | Lierke |
| 4,099,854 A | 7/1978 | Decker et al. |
| 4,200,472 A | 4/1980 | Chappell et al. |
| 4,228,437 A | 10/1980 | Shelton |
| 4,287,449 A | 9/1981 | Takeda et al. |
| 4,377,324 A | 3/1983 | Durand et al. |
| 4,378,567 A | 3/1983 | Mir |
| 4,389,096 A | 6/1983 | Hori et al. |
| 4,400,577 A | 8/1983 | Spear |
| 4,403,248 A | 9/1983 | Te Velde |
| 4,421,381 A | 12/1983 | Ueda et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | Te Velde |
| 4,519,676 A | 5/1985 | Te Velde |
| 4,531,126 A | 7/1985 | Sadones |
| 4,633,031 A | 12/1986 | Todorof |
| 4,663,083 A | 5/1987 | Marks |
| 4,681,403 A | 7/1987 | Te Velde et al. |
| 4,681,406 A | 7/1987 | Naito et al. |
| 4,748,366 A | 5/1988 | Taylor |
| 4,786,128 A | 11/1988 | Birnbach |
| 4,790,635 A | 12/1988 | Apsley |
| 4,832,459 A | 5/1989 | Harper et al. |
| 4,850,682 A | 7/1989 | Gerritsen |
| 4,859,060 A | 8/1989 | Katagiri et al. |
| 4,863,224 A | 9/1989 | Afian et al. |
| 4,878,741 A | 11/1989 | Fergason |
| 4,915,479 A | 4/1990 | Clarke |
| 4,918,577 A | 4/1990 | Furudate |
| 4,947,291 A | 8/1990 | McDermott |
| 4,961,617 A | 10/1990 | Shahidi et al. |
| 4,974,942 A | 12/1990 | Gross et al. |
| 4,980,775 A | 12/1990 | Brody |
| 4,982,184 A | 1/1991 | Kirkwood |
| 5,022,745 A | 6/1991 | Zayhowski et al. |
| 5,037,173 A | 8/1991 | Sampsell et al. |
| 5,038,224 A | 8/1991 | Martulli et al. |
| 5,042,921 A | 8/1991 | Sato et al. |
| 5,044,736 A | 9/1991 | Jaskie et al. |
| 5,075,796 A | 12/1991 | Schildkraut et al. |
| 5,110,370 A | 5/1992 | Vogeli et al. |
| 5,124,834 A | 6/1992 | Cusano et al. |
| 5,142,414 A | 8/1992 | Koehler |
| 5,151,585 A | 9/1992 | Siebert |
| 5,151,801 A | 9/1992 | Hiroshima |
| 5,153,771 A | 10/1992 | Link et al. |
| 5,164,858 A | 11/1992 | Aguilera, Jr. et al. |
| 5,168,406 A | 12/1992 | Nelson |
| 5,192,946 A | 3/1993 | Thompson et al. |
| 5,206,747 A | 4/1993 | Wiley et al. |
| 5,221,982 A | 6/1993 | Faris |
| 5,226,099 A | 7/1993 | Mignardi et al. |
| 5,231,532 A | 7/1993 | Magel et al. |
| 5,233,385 A | 8/1993 | Sampsell |
| 5,261,970 A | 11/1993 | Landis et al. |
| 5,272,496 A | 12/1993 | Nicolas et al. |
| 5,278,680 A | 1/1994 | Karasawa et al. |
| 5,283,600 A | 2/1994 | Imai |
| 5,287,215 A | 2/1994 | Warde et al. |
| 5,289,300 A | 2/1994 | Yamazaki et al. |
| 5,291,314 A | 3/1994 | Agranat |
| 5,293,272 A | 3/1994 | Jannson et al. |
| 5,311,360 A | 5/1994 | Bloom et al. |
| 5,326,426 A | 7/1994 | Tam et al. |
| 5,327,263 A | 7/1994 | Katagiri et al. |
| 5,339,179 A | 8/1994 | Rudisill et al. |
| 5,341,242 A | 8/1994 | Gilboa et al. |
| 5,345,322 A | 9/1994 | Fergason |
| 5,356,488 A | 10/1994 | Hezel |
| 5,361,190 A | 11/1994 | Roberts et al. |
| 5,365,283 A | 11/1994 | Doherty et al. |
| 5,381,253 A | 1/1995 | Sharp et al. |
| 5,387,953 A | 2/1995 | Minoura et al. |
| 5,387,991 A | 2/1995 | Mitsutake et al. |
| 5,398,125 A | 3/1995 | Willett et al. |
| 5,398,170 A | 3/1995 | Lee |
| 5,401,983 A | 3/1995 | Jokerst et al. |
| 5,418,631 A | 5/1995 | Tedesco |
| 5,446,510 A | 8/1995 | Mitsutake et al. |
| 5,448,314 A | 9/1995 | Heimbuch et al. |
| 5,448,659 A | 9/1995 | Tsutsui et al. |
| 5,452,385 A | 9/1995 | Izumi et al. |
| 5,459,610 A | 10/1995 | Bloom et al. |
| 5,467,417 A | 11/1995 | Nakamura et al. |
| 5,474,865 A | 12/1995 | Vasudev |
| 5,481,385 A | 1/1996 | Zimmerman et al. |
| 5,497,172 A | 3/1996 | Doherty et al. |
| 5,500,635 A | 3/1996 | Mott |
| 5,500,761 A | 3/1996 | Goossen et al. |
| 5,515,184 A | 5/1996 | Caulfield et al. |
| 5,517,347 A | 5/1996 | Sampsell |
| 5,517,366 A | 5/1996 | Togino |
| 5,550,373 A | 8/1996 | Cole et al. |
| 5,555,186 A | 9/1996 | Shioya |
| 5,579,149 A | 11/1996 | Moret et al. |
| 5,594,830 A | 1/1997 | Winston et al. |
| 5,601,351 A | 2/1997 | Van den Brandt |
| 5,604,607 A | 2/1997 | Mirzaoff |
| 5,606,441 A | 2/1997 | Florence et al. |
| 5,615,024 A | 3/1997 | May et al. |
| 5,619,059 A | 4/1997 | Li et al. |
| 5,619,365 A | 4/1997 | Rhoads et al. |
| 5,619,366 A | 4/1997 | Rhoads et al. |
| 5,626,408 A | 5/1997 | Heynderickx et al. |
| 5,633,739 A | 5/1997 | Matsuyama et al. |
| 5,636,052 A | 6/1997 | Arney et al. |
| 5,638,084 A | 6/1997 | Kalt |
| 5,647,036 A | 7/1997 | Deacon et al. |
| 5,650,865 A | 7/1997 | Smith |
| 5,659,410 A | 8/1997 | Koike et al. |
| 5,671,314 A | 9/1997 | Gregory et al. |
| 5,671,994 A | 9/1997 | Tai et al. |
| 5,673,128 A | 9/1997 | Ohta et al. |
| 5,703,667 A | 12/1997 | Ochiai |
| 5,703,710 A | 12/1997 | Brinkman et al. |
| 5,706,134 A | 1/1998 | Konno et al. |
| 5,710,656 A | 1/1998 | Goossen |
| 5,712,694 A | 1/1998 | Taira et al. |
| 5,731,857 A | 3/1998 | Neijzen |
| 5,735,590 A | 4/1998 | Kashima et al. |
| 5,739,945 A | 4/1998 | Tayebati |
| 5,745,281 A | 4/1998 | Yi et al. |
| 5,749,642 A | 5/1998 | Kimura et al. |
| 5,751,492 A | 5/1998 | Meyers |
| 5,754,260 A | 5/1998 | Ooi et al. |
| 5,771,124 A | 6/1998 | Kintz et al. |
| 5,771,321 A | 6/1998 | Stern |
| 5,772,299 A | 6/1998 | Koo et al. |
| 5,782,993 A | 7/1998 | Ponewash |
| 5,782,995 A | 7/1998 | Nanya et al. |
| 5,783,614 A | 7/1998 | Chen et al. |
| 5,805,117 A | 9/1998 | Mazurek et al. |
| 5,808,708 A | 9/1998 | Oyama et al. |
| 5,810,464 A | 9/1998 | Ishikawa et al. |
| 5,815,229 A | 9/1998 | Shapiro |
| 5,816,677 A | 10/1998 | Kurematsu et al. |
| 5,818,095 A | 10/1998 | Sampsell |
| 5,835,255 A | 11/1998 | Miles |
| 5,835,256 A | 11/1998 | Huibers |
| 5,845,035 A | 12/1998 | Wimberger-Friedl |

(56) References Cited

U.S. PATENT DOCUMENTS

| | | | |
|---|---|---|---|
| 5,853,240 A | 12/1998 | Tanaka et al. | |
| 5,853,310 A | 12/1998 | Nishimura et al. | |
| 5,854,872 A | 12/1998 | Tai | |
| 5,868,480 A | 2/1999 | Zeinali | |
| 5,877,874 A | 3/1999 | Rosenberg | |
| 5,883,684 A | 3/1999 | Millikan et al. | |
| 5,886,688 A | 3/1999 | Fifield et al. | |
| 5,892,598 A | 4/1999 | Asakawa et al. | |
| 5,894,359 A | 4/1999 | Suzuki et al. | |
| 5,895,851 A | 4/1999 | Kano et al. | |
| 5,913,594 A | 6/1999 | Iimura | |
| 5,914,804 A | 6/1999 | Goossen | |
| 5,920,417 A | 7/1999 | Johnson | |
| 5,933,183 A | 8/1999 | Enomoto et al. | |
| 5,959,763 A | 9/1999 | Bozler et al. | |
| 5,975,703 A | 11/1999 | Holman et al. | |
| 5,982,540 A | 11/1999 | Koike et al. | |
| 5,986,796 A | 11/1999 | Miles | |
| 5,991,073 A | 11/1999 | Woodgate et al. | |
| 5,999,239 A | 12/1999 | Larson | |
| 6,002,829 A | 12/1999 | Winston et al. | |
| 6,008,449 A | 12/1999 | Cole | |
| 6,014,192 A | 1/2000 | Lehureau et al. | |
| 6,023,373 A | 2/2000 | Inoguchi et al. | |
| 6,028,649 A | 2/2000 | Faris et al. | |
| 6,028,690 A | 2/2000 | Carter et al. | |
| 6,031,653 A | 2/2000 | Wang | |
| 6,040,937 A | 3/2000 | Miles | |
| 6,046,840 A | 4/2000 | Huibers | |
| 6,048,071 A | 4/2000 | Sawayama | |
| 6,049,317 A | 4/2000 | Thompson et al. | |
| 6,055,090 A | 4/2000 | Miles | |
| 6,072,620 A | 6/2000 | Shiono et al. | |
| 6,073,034 A | 6/2000 | Jacobsen et al. | |
| 6,074,069 A | 6/2000 | Chao-Ching et al. | |
| 6,088,102 A | 7/2000 | Manhart | |
| 6,088,941 A | 7/2000 | Inbar et al. | |
| 6,091,469 A | 7/2000 | Naito | |
| 6,094,285 A | 7/2000 | Wickham et al. | |
| 6,099,134 A | 8/2000 | Taniguchi et al. | |
| 6,100,952 A * | 8/2000 | Marvin et al. | 349/62 |
| 6,113,239 A | 9/2000 | Sampsell et al. | |
| 6,147,728 A | 11/2000 | Okumura et al. | |
| 6,151,089 A | 11/2000 | Yang et al. | |
| 6,166,834 A | 12/2000 | Taketomi et al. | |
| 6,167,761 B1 | 1/2001 | Hanzawa et al. | |
| 6,195,196 B1 | 2/2001 | Kimura et al. | |
| 6,196,691 B1 | 3/2001 | Ochiai | |
| 6,199,989 B1 | 3/2001 | Maeda et al. | |
| 6,201,633 B1 | 3/2001 | Peeters et al. | |
| 6,208,466 B1 | 3/2001 | Liu et al. | |
| 6,211,976 B1 | 4/2001 | Popovich et al. | |
| 6,213,606 B1 | 4/2001 | Holman et al. | |
| 6,232,937 B1 | 5/2001 | Jacobsen et al. | |
| 6,243,149 B1 | 6/2001 | Swanson et al. | |
| 6,259,082 B1 | 7/2001 | Fujimoto et al. | |
| 6,273,577 B1 | 8/2001 | Goto et al. | |
| 6,282,010 B1 | 8/2001 | Sulzbach et al. | |
| 6,285,424 B1 | 9/2001 | Yoshida | |
| 6,288,824 B1 | 9/2001 | Kastalsky | |
| 6,292,504 B1 | 9/2001 | Halmos | |
| 6,300,558 B1 | 10/2001 | Takamoto et al. | |
| 6,301,000 B1 | 10/2001 | Johnson | |
| 6,301,026 B1 | 10/2001 | Ueda | |
| 6,322,236 B1 | 11/2001 | Campbell et al. | |
| 6,323,415 B1 | 11/2001 | Uematsu et al. | |
| 6,323,892 B1 | 11/2001 | Mihara | |
| 6,323,923 B1 | 11/2001 | Hoshino et al. | |
| 6,323,987 B1 | 11/2001 | Rinaudo et al. | |
| 6,342,970 B1 | 1/2002 | Sperger et al. | |
| 6,356,378 B1 | 3/2002 | Huibers | |
| 6,359,668 B1 | 3/2002 | Iijima et al. | |
| 6,368,885 B1 | 4/2002 | Offenberg et al. | |
| 6,375,327 B2 | 4/2002 | Holman et al. | |
| 6,377,233 B2 | 4/2002 | Colgan et al. | |
| 6,377,535 B1 | 4/2002 | Chen et al. | |
| 6,381,022 B1 | 4/2002 | Zavracky | |
| 6,399,257 B1 | 6/2002 | Shirota et al. | |
| 6,400,738 B1 | 6/2002 | Tucker et al. | |
| 6,402,325 B1 | 6/2002 | Yamamoto | |
| 6,407,785 B1 | 6/2002 | Yamazaki | |
| 6,411,423 B2 | 6/2002 | Ham | |
| 6,412,969 B1 | 7/2002 | Torihara et al. | |
| 6,421,103 B2 | 7/2002 | Yamaguchi | |
| 6,431,716 B1 | 8/2002 | Kusakabe | |
| 6,442,124 B1 | 8/2002 | Chung et al. | |
| 6,448,709 B1 | 9/2002 | Chuang et al. | |
| 6,454,452 B1 | 9/2002 | Sasagawa et al. | |
| 6,456,279 B1 | 9/2002 | Kubo et al. | |
| 6,466,354 B1 | 10/2002 | Gudeman | |
| 6,466,358 B2 | 10/2002 | Tew | |
| 6,470,115 B1 | 10/2002 | Yonekubo | |
| 6,478,432 B1 | 11/2002 | Dyner | |
| 6,480,634 B1 | 11/2002 | Corrigan | |
| 6,483,613 B1 | 11/2002 | Woodgate et al. | |
| 6,492,065 B2 | 12/2002 | Nakagaki et al. | |
| 6,493,475 B1 | 12/2002 | Lin | |
| 6,494,588 B1 | 12/2002 | Okada | |
| 6,518,944 B1 | 2/2003 | Doane et al. | |
| 6,519,073 B1 | 2/2003 | Goossen | |
| 6,520,643 B1 | 2/2003 | Holman et al. | |
| 6,522,373 B1 | 2/2003 | Hira et al. | |
| 6,522,792 B1 | 2/2003 | Sugamata et al. | |
| 6,522,794 B1 | 2/2003 | Bischel et al. | |
| 6,527,410 B2 | 3/2003 | Yamaguchi | |
| 6,538,813 B1 | 3/2003 | Magno et al. | |
| 6,540,368 B2 | 4/2003 | Akaoka | |
| 6,545,734 B2 | 4/2003 | Cornelissen et al. | |
| 6,549,338 B1 | 4/2003 | Wolverton et al. | |
| 6,561,661 B2 | 5/2003 | Egawa | |
| 6,565,225 B2 | 5/2003 | Mabuchi et al. | |
| 6,574,033 B1 | 6/2003 | Chui et al. | |
| 6,577,429 B1 | 6/2003 | Kurtz et al. | |
| 6,580,496 B2 | 6/2003 | Bamji et al. | |
| 6,582,095 B1 | 6/2003 | Toyoda | |
| 6,592,234 B2 | 7/2003 | Epstein et al. | |
| 6,597,419 B1 | 7/2003 | Okada et al. | |
| 6,597,490 B2 | 7/2003 | Tayebati | |
| 6,598,987 B1 | 7/2003 | Parikka | |
| 6,603,520 B2 | 8/2003 | Umemoto | |
| 6,624,944 B1 | 9/2003 | Wallace et al. | |
| 6,630,786 B2 | 10/2003 | Cummings et al. | |
| 6,630,968 B1 | 10/2003 | Tsuchihashi et al. | |
| 6,631,998 B2 | 10/2003 | Egawa et al. | |
| 6,636,283 B2 | 10/2003 | Sasagawa et al. | |
| 6,636,322 B1 | 10/2003 | Terashita | |
| 6,636,358 B2 | 10/2003 | Umemoto et al. | |
| 6,636,653 B2 | 10/2003 | Miracky et al. | |
| 6,642,913 B1 | 11/2003 | Kimura et al. | |
| 6,642,976 B2 | 11/2003 | Umemoto et al. | |
| 6,643,067 B2 | 11/2003 | Miyamae et al. | |
| 6,643,069 B2 | 11/2003 | Dewald | |
| 6,646,772 B1 | 11/2003 | Popovich et al. | |
| 6,650,455 B2 | 11/2003 | Miles | |
| 6,652,109 B2 | 11/2003 | Nakamura | |
| 6,655,820 B2 | 12/2003 | Jung et al. | |
| 6,657,700 B2 | 12/2003 | Sako et al. | |
| 6,659,615 B2 | 12/2003 | Umemoto | |
| 6,660,997 B2 | 12/2003 | Laberge et al. | |
| 6,667,782 B1 | 12/2003 | Taira et al. | |
| 6,669,350 B2 | 12/2003 | Yamashita et al. | |
| 6,674,562 B1 | 1/2004 | Miles | |
| 6,677,709 B1 | 1/2004 | Ma et al. | |
| 6,680,792 B2 | 1/2004 | Miles | |
| 6,683,693 B1 | 1/2004 | O Tsuka et al. | |
| 6,687,040 B2 | 2/2004 | Kimura | |
| 6,693,690 B2 | 2/2004 | Umemoto | |
| 6,696,140 B2 | 2/2004 | Suzuki | |
| 6,706,339 B1 | 3/2004 | Miyatake et al. | |
| 6,709,123 B2 | 3/2004 | Flohr et al. | |
| 6,738,194 B1 | 5/2004 | Ramirez et al. | |
| 6,741,377 B2 | 5/2004 | Miles | |
| 6,742,907 B2 | 6/2004 | Funamoto et al. | |
| 6,742,921 B2 | 6/2004 | Umemoto et al. | |

(56) References Cited

U.S. PATENT DOCUMENTS

| | | |
|---|---|---|
| 6,747,801 B2 | 6/2004 | Umemoto et al. |
| 6,751,023 B2 | 6/2004 | Umemoto et al. |
| 6,760,135 B1 | 7/2004 | Payne et al. |
| 6,760,146 B2 | 7/2004 | Ikeda et al. |
| 6,761,461 B2 | 7/2004 | Mizutani et al. |
| 6,768,555 B2 | 7/2004 | Chen et al. |
| 6,773,126 B1 | 8/2004 | Hatjasalo et al. |
| 6,774,962 B2 | 8/2004 | Yoon |
| 6,778,746 B2 | 8/2004 | Charlton et al. |
| 6,784,948 B2 | 8/2004 | Kawashima et al. |
| 6,792,293 B1 | 9/2004 | Awan et al. |
| 6,794,119 B2 | 9/2004 | Miles |
| 6,806,924 B2 | 10/2004 | Niiyama et al. |
| 6,811,267 B1 | 11/2004 | Allen et al. |
| 6,819,380 B2 | 11/2004 | Wen et al. |
| 6,822,745 B2 | 11/2004 | De Groot et al. |
| 6,822,780 B1 | 11/2004 | Long, Jr. |
| 6,825,895 B2 | 11/2004 | Nakano et al. |
| 6,826,000 B2 | 11/2004 | Lee et al. |
| 6,829,258 B1 | 12/2004 | Carlisle |
| 6,841,787 B2 | 1/2005 | Almogy |
| 6,844,953 B2 | 1/2005 | Reboa |
| 6,844,959 B2 | 1/2005 | Huibers et al. |
| 6,852,396 B1 | 2/2005 | Mineo |
| 6,853,418 B2 | 2/2005 | Suzuki et al. |
| 6,862,141 B2 | 3/2005 | Olczak |
| 6,863,428 B2 | 3/2005 | Lundin |
| 6,864,882 B2 | 3/2005 | Newton |
| 6,865,312 B2 | 3/2005 | Niv et al. |
| 6,866,393 B2 | 3/2005 | Yano et al. |
| 6,867,896 B2 | 3/2005 | Miles |
| 6,870,581 B2 | 3/2005 | Li et al. |
| 6,871,982 B2 | 3/2005 | Holman et al. |
| 6,879,354 B1 | 4/2005 | Sawayama |
| 6,880,959 B2 | 4/2005 | Houston |
| 6,882,421 B2 | 4/2005 | Opsal et al. |
| 6,882,458 B2 | 4/2005 | Lin et al. |
| 6,882,461 B1 | 4/2005 | Tsai et al. |
| 6,883,924 B2 | 4/2005 | Maeda et al. |
| 6,883,934 B2 | 4/2005 | Kawakami et al. |
| 6,885,377 B2 | 4/2005 | Lim et al. |
| 6,891,530 B2 | 5/2005 | Umemoto et al. |
| 6,897,855 B1 | 5/2005 | Matthies et al. |
| 6,897,923 B2 | 5/2005 | Kanesaka et al. |
| 6,912,022 B2 | 6/2005 | Lin et al. |
| 6,917,469 B2 | 7/2005 | Momose et al. |
| 6,927,387 B2 | 8/2005 | Viktorovitch |
| 6,930,816 B2 | 8/2005 | Mochizuki |
| 6,940,653 B2 | 9/2005 | Favalora et al. |
| 6,951,401 B2 | 10/2005 | Van Hees et al. |
| 6,960,010 B2 | 11/2005 | Matsumoto et al. |
| 6,964,484 B2 | 11/2005 | Gupta et al. |
| 6,967,779 B2 | 11/2005 | Fadel et al. |
| 6,970,031 B1 | 11/2005 | Martin et al. |
| 6,972,827 B2 | 12/2005 | Mi |
| 6,982,820 B2 | 1/2006 | Tsai |
| 6,995,890 B2 | 2/2006 | Lin |
| 6,998,196 B2 | 2/2006 | Rich et al. |
| 6,999,225 B2 | 2/2006 | Lin et al. |
| 6,999,235 B2 | 2/2006 | Nakamura |
| 6,999,236 B2 | 2/2006 | Lin et al. |
| 7,002,726 B2 | 2/2006 | Patel et al. |
| 7,004,610 B2 | 2/2006 | Yamashita et al. |
| 7,006,272 B2 | 2/2006 | Tsai |
| 7,009,754 B2 | 3/2006 | Huibers |
| 7,010,212 B2 | 3/2006 | Emmons et al. |
| 7,012,659 B2 | 3/2006 | Smith et al. |
| 7,016,095 B2 | 3/2006 | Lin |
| 7,018,088 B2 | 3/2006 | Yu et al. |
| 7,019,734 B2 | 3/2006 | Cross et al. |
| 7,025,461 B2 | 4/2006 | Veligdan et al. |
| 7,030,949 B2 | 4/2006 | Kashima |
| 7,034,981 B2 | 4/2006 | Makigaki |
| 7,038,752 B2 | 5/2006 | Lin |
| 7,041,344 B2 | 5/2006 | Kusume et al. |
| 7,042,444 B2 | 5/2006 | Cok |
| 7,042,643 B2 | 5/2006 | Miles |
| 7,046,409 B2 | 5/2006 | Kihara |
| 7,050,219 B2 | 5/2006 | Kimura |
| 7,054,045 B2 | 5/2006 | McPheters et al. |
| 7,056,001 B2 | 6/2006 | Chuang |
| 7,064,875 B2 | 6/2006 | Kawano et al. |
| 7,068,948 B2 | 6/2006 | Wei et al. |
| 7,072,093 B2 | 7/2006 | Piehl et al. |
| 7,072,096 B2 | 7/2006 | Holman et al. |
| 7,092,163 B2 | 8/2006 | Bastawros et al. |
| 7,099,058 B2 | 8/2006 | Takemori et al. |
| 7,110,158 B2 | 9/2006 | Miles |
| 7,113,339 B2 | 9/2006 | Taguchi et al. |
| 7,123,216 B1 | 10/2006 | Miles |
| 7,126,738 B2 | 10/2006 | Miles |
| 7,128,459 B2 | 10/2006 | Igarashi et al. |
| 7,130,104 B2 | 10/2006 | Cummings |
| 7,133,022 B2 | 11/2006 | Grabert |
| 7,136,213 B2 | 11/2006 | Chui |
| 7,138,984 B1 | 11/2006 | Miles |
| 7,142,346 B2 | 11/2006 | Chui et al. |
| 7,142,347 B2 | 11/2006 | Islam |
| 7,156,546 B2 | 1/2007 | Higashiyama |
| 7,161,728 B2 | 1/2007 | Sampsell et al. |
| 7,161,730 B2 | 1/2007 | Floyd |
| 7,172,915 B2 | 2/2007 | Lin et al. |
| 7,187,489 B2 | 3/2007 | Miles |
| 7,210,806 B2 | 5/2007 | Holman et al. |
| 7,218,429 B2 | 5/2007 | Batchko |
| 7,218,812 B2 | 5/2007 | Maxwell et al. |
| 7,221,418 B2 | 5/2007 | Lee et al. |
| 7,223,010 B2 | 5/2007 | Min et al. |
| 7,236,663 B2 | 6/2007 | Wakita et al. |
| 7,256,922 B2 | 8/2007 | Chui et al. |
| 7,262,754 B1 | 8/2007 | Yamazaki |
| 7,262,916 B2 | 8/2007 | Kao et al. |
| 7,264,389 B2 | 9/2007 | Sado et al. |
| 7,304,784 B2 | 12/2007 | Chui et al. |
| 7,324,248 B2 | 1/2008 | Brotherton-Ratcliffe et al. |
| 7,327,510 B2 | 2/2008 | Cummings et al. |
| 7,335,780 B2 | 2/2008 | Annis |
| 7,336,329 B2 | 2/2008 | Yoon |
| 7,342,705 B2 | 3/2008 | Chui et al. |
| 7,342,709 B2 | 3/2008 | Lin |
| 7,349,139 B2 | 3/2008 | Chui et al. |
| 7,349,141 B2 | 3/2008 | Tung et al. |
| 7,352,501 B2 | 4/2008 | Chopra et al. |
| 7,352,940 B2 | 4/2008 | Charters et al. |
| 7,355,780 B2 | 4/2008 | Chui |
| 7,359,011 B2 | 4/2008 | Hamada |
| 7,360,899 B2 | 4/2008 | McGuire, Jr. et al. |
| 7,366,393 B2 | 4/2008 | Cassarly et al. |
| 7,369,292 B2 | 5/2008 | Xu et al. |
| 7,369,294 B2 | 5/2008 | Gally et al. |
| 7,372,449 B2 | 5/2008 | Kodama et al. |
| 7,372,631 B2 | 5/2008 | Ozawa |
| 7,374,327 B2 | 5/2008 | Schexnaider |
| 7,375,779 B2 | 5/2008 | Lee et al. |
| 7,376,308 B2 | 5/2008 | Cheben et al. |
| 7,377,678 B2 | 5/2008 | Huang et al. |
| 7,380,970 B2 | 6/2008 | Hwang et al. |
| 7,385,748 B2 | 6/2008 | Miles |
| 7,388,181 B2 | 6/2008 | Han et al. |
| 7,388,706 B2 | 6/2008 | Miles |
| 7,389,476 B2 | 6/2008 | Senda et al. |
| 7,400,439 B2 | 7/2008 | Holman |
| 7,403,180 B1 | 7/2008 | Silverstein et al. |
| 7,417,735 B2 | 8/2008 | Cummings et al. |
| 7,417,784 B2 | 8/2008 | Sasagawa et al. |
| 7,420,638 B2 | 9/2008 | Tasaka et al. |
| 7,420,725 B2 | 9/2008 | Kothari |
| 7,450,295 B2 | 11/2008 | Tung et al. |
| 7,456,805 B2 | 11/2008 | Ouderkirk et al. |
| 7,463,421 B2 | 12/2008 | Miles |
| 7,477,809 B1 | 1/2009 | Tan et al. |
| 7,494,830 B2 | 2/2009 | Liu et al. |
| 7,498,621 B2 | 3/2009 | Seitz |
| 7,502,081 B2 | 3/2009 | Umemoto et al. |

(56) References Cited

U.S. PATENT DOCUMENTS

| | | | |
|---|---|---|---|
| 7,515,336 B2 | 4/2009 | Lippey | |
| 7,520,642 B2 | 4/2009 | Holman et al. | |
| 7,557,935 B2 | 7/2009 | Baruch | |
| 7,561,323 B2 | 7/2009 | Gally | |
| 7,564,612 B2 | 7/2009 | Chui | |
| 7,603,001 B2 | 10/2009 | Wang et al. | |
| 7,630,123 B2 | 12/2009 | Kothari | |
| 7,643,203 B2 | 1/2010 | Gousev et al. | |
| 7,663,714 B2 | 2/2010 | Haga et al. | |
| 7,684,126 B2 | 3/2010 | Eckhardt | |
| 7,688,494 B2 | 3/2010 | Xu et al. | |
| 7,692,844 B2 | 4/2010 | Miles | |
| 7,701,029 B2 | 4/2010 | Mabuchi | |
| 7,706,050 B2 | 4/2010 | Sampsell | |
| 7,710,632 B2 | 5/2010 | Cummings | |
| 7,710,636 B2 | 5/2010 | Chui | |
| 7,719,500 B2 | 5/2010 | Chui | |
| 7,719,747 B2 | 5/2010 | Tung et al. | |
| 7,733,439 B2 | 6/2010 | Sampsell | |
| 7,750,886 B2 | 7/2010 | Sampsell | |
| 7,766,498 B2 | 8/2010 | Sampsell | |
| 7,766,531 B2 | 8/2010 | Anderson et al. | |
| 7,768,690 B2 | 8/2010 | Sampsell | |
| 7,777,954 B2 | 8/2010 | Gruhlke | |
| 7,807,488 B2 | 10/2010 | Gally et al. | |
| 7,813,029 B2 | 10/2010 | Kothari et al. | |
| 7,843,061 B2 | 11/2010 | Poli et al. | |
| 7,845,841 B2 | 12/2010 | Sampsell | |
| 7,848,001 B2 | 12/2010 | Miles | |
| 7,855,824 B2 | 12/2010 | Gally | |
| 7,855,827 B2 | 12/2010 | Xu et al. | |
| 7,864,395 B2 | 1/2011 | Chui | |
| 7,872,394 B1 | 1/2011 | Gritters et al. | |
| 7,876,397 B2 | 1/2011 | Krijn et al. | |
| 7,880,954 B2 | 2/2011 | Sampsell | |
| 7,898,521 B2 | 3/2011 | Gally et al. | |
| 7,907,319 B2 | 3/2011 | Miles | |
| 7,911,428 B2 | 3/2011 | Gally et al. | |
| 7,916,378 B2 | 3/2011 | Wang | |
| 7,928,928 B2 | 4/2011 | Gally et al. | |
| 7,933,475 B2 | 4/2011 | Wang et al. | |
| 7,944,602 B2 | 5/2011 | Chui | |
| 7,949,213 B2 | 5/2011 | Mienko et al. | |
| 7,986,451 B2 | 7/2011 | Gally et al. | |
| 8,031,133 B2 | 10/2011 | Gally et al. | |
| 8,045,252 B2 | 10/2011 | Chui et al. | |
| 8,045,256 B2 | 10/2011 | Kothari | |
| 8,059,326 B2 | 11/2011 | Miles | |
| 8,068,710 B2 * | 11/2011 | Bita et al. | 385/133 |
| 8,072,402 B2 | 12/2011 | Xu | |
| 8,111,445 B2 | 2/2012 | Chui et al. | |
| 8,111,446 B2 | 2/2012 | Gally et al. | |
| 8,169,689 B2 | 5/2012 | Sampsell | |
| 8,300,304 B2 | 10/2012 | Gally et al. | |
| 8,408,775 B1 | 4/2013 | Coleman | |
| 2001/0003487 A1 | 6/2001 | Miles | |
| 2001/0003504 A1 | 6/2001 | Ishihara et al. | |
| 2001/0010952 A1 | 8/2001 | Abramovich | |
| 2001/0019240 A1 | 9/2001 | Takahashi | |
| 2001/0019380 A1 | 9/2001 | Ishihara | |
| 2001/0019479 A1 | 9/2001 | Nakabayashi et al. | |
| 2001/0022636 A1 | 9/2001 | Yang et al. | |
| 2001/0026001 A1 | 10/2001 | Yagi | |
| 2001/0030861 A1 | 10/2001 | Oda et al. | |
| 2001/0055076 A1 | 12/2001 | Ochi et al. | |
| 2001/0055208 A1 | 12/2001 | Kimura | |
| 2002/0006036 A1 | 1/2002 | Egawa et al. | |
| 2002/0034071 A1 | 3/2002 | Mabuchi | |
| 2002/0039155 A1 | 4/2002 | Umemoto | |
| 2002/0044445 A1 | 4/2002 | Bohler et al. | |
| 2002/0050286 A1 | 5/2002 | Kubota | |
| 2002/0050764 A1 | 5/2002 | Koga et al. | |
| 2002/0051103 A1 | 5/2002 | Faris et al. | |
| 2002/0054258 A1 | 5/2002 | Kondo | |
| 2002/0057399 A1 | 5/2002 | Ishitaka | |
| 2002/0060907 A1 | 5/2002 | Saccomanno | |
| 2002/0075245 A1 | 6/2002 | Kawashima et al. | |
| 2002/0075555 A1 | 6/2002 | Miles | |
| 2002/0080465 A1 | 6/2002 | Han et al. | |
| 2002/0081089 A1 | 6/2002 | Min et al. | |
| 2002/0106182 A1 | 8/2002 | Kawashima | |
| 2002/0131151 A1 | 9/2002 | Engler et al. | |
| 2002/0149584 A1 | 10/2002 | Simpson et al. | |
| 2002/0153486 A1 | 10/2002 | Ishizuya et al. | |
| 2002/0154256 A1 | 10/2002 | Gotoh et al. | |
| 2002/0167730 A1 | 11/2002 | Needham et al. | |
| 2002/0172039 A1 | 11/2002 | Inditsky | |
| 2002/0172810 A1 | 11/2002 | Murata et al. | |
| 2002/0176035 A1 | 11/2002 | Yamazaki | |
| 2002/0180910 A1 | 12/2002 | Umemoto | |
| 2003/0001985 A1 | 1/2003 | Doe | |
| 2003/0006730 A1 | 1/2003 | Tachibana | |
| 2003/0011864 A1 | 1/2003 | Flanders | |
| 2003/0012009 A1 | 1/2003 | Suzuki et al. | |
| 2003/0016930 A1 | 1/2003 | Inditsky | |
| 2003/0058069 A1 | 3/2003 | Schwartz et al. | |
| 2003/0067760 A1 | 4/2003 | Jagt et al. | |
| 2003/0081154 A1 | 5/2003 | Coleman et al. | |
| 2003/0083429 A1 | 5/2003 | Smith et al. | |
| 2003/0086030 A1 | 5/2003 | Taniguchi et al. | |
| 2003/0086031 A1 | 5/2003 | Taniguchi | |
| 2003/0095401 A1 | 5/2003 | Hanson et al. | |
| 2003/0098957 A1 | 5/2003 | Haldiman | |
| 2003/0099118 A1 | 5/2003 | Saitoh | |
| 2003/0103177 A1 | 6/2003 | Maeda et al. | |
| 2003/0103344 A1 | 6/2003 | Niida et al. | |
| 2003/0107692 A1 | 6/2003 | Sekiguchi | |
| 2003/0136759 A1 | 7/2003 | Mikolas | |
| 2003/0137617 A1 | 7/2003 | Cornelissen et al. | |
| 2003/0142247 A1 | 7/2003 | Nishiyama et al. | |
| 2003/0161040 A1 | 8/2003 | Ishii et al. | |
| 2003/0165067 A1 | 9/2003 | Imamura et al. | |
| 2003/0169385 A1 | 9/2003 | Okuwaki | |
| 2003/0169386 A1 | 9/2003 | Goto et al. | |
| 2003/0184690 A1 | 10/2003 | Ogiwara et al. | |
| 2003/0193630 A1 | 10/2003 | Chiou | |
| 2003/0206281 A1 | 11/2003 | Jain | |
| 2003/0210222 A1 | 11/2003 | Ogiwara et al. | |
| 2003/0210363 A1 | 11/2003 | Yasukawa et al. | |
| 2003/0210366 A1 | 11/2003 | Huang et al. | |
| 2003/0210367 A1 | 11/2003 | Nakano et al. | |
| 2003/0213514 A1 | 11/2003 | Ortabasi | |
| 2003/0214621 A1 | 11/2003 | Kim et al. | |
| 2003/0222857 A1 | 12/2003 | Abileah | |
| 2003/0222980 A1 | 12/2003 | Miyagaki et al. | |
| 2003/0231483 A1 | 12/2003 | Higashiyama | |
| 2004/0001169 A1 | 1/2004 | Saiki et al. | |
| 2004/0017599 A1 | 1/2004 | Yang | |
| 2004/0027339 A1 | 2/2004 | Schulz | |
| 2004/0032401 A1 | 2/2004 | Nakazawa | |
| 2004/0032659 A1 | 2/2004 | Drinkwater | |
| 2004/0051929 A1 | 3/2004 | Sampsell et al. | |
| 2004/0061946 A1 | 4/2004 | Yoshikawa et al. | |
| 2004/0066477 A1 | 4/2004 | Morimoto et al. | |
| 2004/0071937 A1 | 4/2004 | Chien et al. | |
| 2004/0080807 A1 | 4/2004 | Chen et al. | |
| 2004/0085748 A1 | 5/2004 | Sugiura | |
| 2004/0100796 A1 | 5/2004 | Ward | |
| 2004/0109303 A1 | 6/2004 | Olczak | |
| 2004/0109305 A1 | 6/2004 | Chisholm | |
| 2004/0114242 A1 | 6/2004 | Sharp | |
| 2004/0115339 A1 | 6/2004 | Ito | |
| 2004/0125048 A1 | 7/2004 | Fukuda et al. | |
| 2004/0135494 A1 | 7/2004 | Miyatake | |
| 2004/0170373 A1 | 9/2004 | Kim | |
| 2004/0174583 A1 | 9/2004 | Chen et al. | |
| 2004/0175577 A1 | 9/2004 | Lin et al. | |
| 2004/0188150 A1 | 9/2004 | Richard et al. | |
| 2004/0207605 A1 | 10/2004 | Mackey et al. | |
| 2004/0207995 A1 | 10/2004 | Park et al. | |
| 2004/0217264 A1 | 11/2004 | Wood et al. | |
| 2004/0217919 A1 | 11/2004 | Piehl et al. | |
| 2004/0228109 A1 | 11/2004 | Leu et al. | |
| 2004/0233357 A1 | 11/2004 | Fujimori et al. | |

(56) References Cited

U.S. PATENT DOCUMENTS

| | | |
|---|---|---|
| 2004/0246743 A1 | 12/2004 | Lee et al. |
| 2004/0248524 A1 | 12/2004 | Flegeo |
| 2005/0002082 A1 | 1/2005 | Miles |
| 2005/0002175 A1 | 1/2005 | Matsui et al. |
| 2005/0010568 A1 | 1/2005 | Nagatomo et al. |
| 2005/0024849 A1 | 2/2005 | Parker et al. |
| 2005/0024890 A1 | 2/2005 | Yamamoto et al. |
| 2005/0035699 A1 | 2/2005 | Tsai |
| 2005/0036095 A1 | 2/2005 | Yeh et al. |
| 2005/0041175 A1 | 2/2005 | Akiyama et al. |
| 2005/0042117 A1 | 2/2005 | Lin |
| 2005/0057442 A1 | 3/2005 | Way |
| 2005/0069209 A1 | 3/2005 | Damera-Venkata et al. |
| 2005/0069254 A1 | 3/2005 | Schultheis et al. |
| 2005/0073507 A1 | 4/2005 | Richter et al. |
| 2005/0088719 A1 | 4/2005 | Patel |
| 2005/0101059 A1 | 5/2005 | Yang et al. |
| 2005/0117088 A1 | 6/2005 | Van |
| 2005/0117623 A1 | 6/2005 | Shchukin et al. |
| 2005/0120553 A1 | 6/2005 | Brown et al. |
| 2005/0133761 A1 | 6/2005 | Thielemans |
| 2005/0141065 A1 | 6/2005 | Masamoto |
| 2005/0146897 A1 | 7/2005 | Mimura |
| 2005/0180145 A1 | 8/2005 | Okuwaki |
| 2005/0195175 A1 | 9/2005 | Anderson |
| 2005/0195370 A1 | 9/2005 | Gore et al. |
| 2005/0195462 A1 | 9/2005 | Lin |
| 2005/0206802 A1 | 9/2005 | Creemers |
| 2005/0207016 A1 | 9/2005 | Ando |
| 2005/0213346 A1 | 9/2005 | Kao et al. |
| 2005/0224694 A1 | 10/2005 | Yaung |
| 2005/0225686 A1 | 10/2005 | Brummack et al. |
| 2005/0231977 A1 | 10/2005 | Hayakawa |
| 2005/0231981 A1 | 10/2005 | Hoelen et al. |
| 2005/0242693 A1 | 11/2005 | Hayashi et al. |
| 2005/0248524 A1 | 11/2005 | Feng et al. |
| 2005/0259302 A9 | 11/2005 | Metz et al. |
| 2005/0259939 A1 | 11/2005 | Rinko |
| 2005/0271325 A1 | 12/2005 | Anderson et al. |
| 2006/0002141 A1 | 1/2006 | Ouderkirk et al. |
| 2006/0002655 A1 | 1/2006 | Smits |
| 2006/0002675 A1 | 1/2006 | Choi et al. |
| 2006/0007510 A1 | 1/2006 | Nishide et al. |
| 2006/0012733 A1 | 1/2006 | Jin et al. |
| 2006/0012739 A1 | 1/2006 | Shibazaki |
| 2006/0022966 A1 | 2/2006 | Mar |
| 2006/0024017 A1 | 2/2006 | Page et al. |
| 2006/0024880 A1 | 2/2006 | Chui et al. |
| 2006/0044523 A1 | 3/2006 | Teijido et al. |
| 2006/0044928 A1 | 3/2006 | Chui et al. |
| 2006/0050032 A1 | 3/2006 | Gunner et al. |
| 2006/0051048 A1 | 3/2006 | Gardiner et al. |
| 2006/0056000 A1 | 3/2006 | Mignard |
| 2006/0056166 A1 | 3/2006 | Yeo et al. |
| 2006/0062016 A1 | 3/2006 | Dejima et al. |
| 2006/0065940 A1 | 3/2006 | Kothari |
| 2006/0066503 A1 | 3/2006 | Sampsell et al. |
| 2006/0066504 A1 | 3/2006 | Sampsell et al. |
| 2006/0066557 A1 | 3/2006 | Floyd |
| 2006/0066560 A1 | 3/2006 | Gally et al. |
| 2006/0066586 A1 | 3/2006 | Gally |
| 2006/0066595 A1 | 3/2006 | Sampsell et al. |
| 2006/0066596 A1 | 3/2006 | Sampsell et al. |
| 2006/0066598 A1 | 3/2006 | Floyd |
| 2006/0066600 A1 | 3/2006 | Palmateer |
| 2006/0066601 A1 | 3/2006 | Kothari et al. |
| 2006/0066641 A1 | 3/2006 | Gally et al. |
| 2006/0066863 A1 | 3/2006 | Cummings et al. |
| 2006/0066936 A1 | 3/2006 | Chui et al. |
| 2006/0066937 A1 | 3/2006 | Chui |
| 2006/0066938 A1 | 3/2006 | Chui |
| 2006/0067028 A1 | 3/2006 | Floyd |
| 2006/0073623 A1 | 4/2006 | Conley, Jr. et al. |
| 2006/0076631 A1 | 4/2006 | Palmateer et al. |
| 2006/0076632 A1 | 4/2006 | Palmateer et al. |
| 2006/0077123 A1 | 4/2006 | Gally |
| 2006/0077126 A1 | 4/2006 | Kothari |
| 2006/0077127 A1 | 4/2006 | Sampsell et al. |
| 2006/0077146 A1 | 4/2006 | Palmateer |
| 2006/0077148 A1 | 4/2006 | Gally et al. |
| 2006/0077149 A1 | 4/2006 | Gally et al. |
| 2006/0077504 A1 | 4/2006 | Floyd |
| 2006/0077505 A1 | 4/2006 | Chui et al. |
| 2006/0077518 A1 | 4/2006 | Chui et al. |
| 2006/0077520 A1 | 4/2006 | Chui et al. |
| 2006/0077521 A1 | 4/2006 | Gally et al. |
| 2006/0077523 A1 | 4/2006 | Cummings et al. |
| 2006/0077524 A1 | 4/2006 | Palmateer |
| 2006/0077528 A1 | 4/2006 | Floyd |
| 2006/0077529 A1 | 4/2006 | Chui et al. |
| 2006/0077533 A1 | 4/2006 | Miles et al. |
| 2006/0077617 A1 | 4/2006 | Floyd |
| 2006/0079048 A1 | 4/2006 | Sampsell |
| 2006/0091824 A1 | 5/2006 | Pate et al. |
| 2006/0103613 A1 | 5/2006 | Chui |
| 2006/0103643 A1 | 5/2006 | Mathew et al. |
| 2006/0103912 A1 | 5/2006 | Katoh et al. |
| 2006/0109682 A1 | 5/2006 | Ko et al. |
| 2006/0109686 A1 | 5/2006 | Sugiura |
| 2006/0110090 A1 | 5/2006 | Ellwood Jr. |
| 2006/0114244 A1 | 6/2006 | Saxena et al. |
| 2006/0126142 A1 | 6/2006 | Choi |
| 2006/0130889 A1 | 6/2006 | Li et al. |
| 2006/0132383 A1 | 6/2006 | Gally et al. |
| 2006/0176241 A1 | 8/2006 | Sampsell |
| 2006/0176487 A1 | 8/2006 | Cummings et al. |
| 2006/0181903 A1 | 8/2006 | Okuwaki |
| 2006/0187676 A1 | 8/2006 | Ishikura |
| 2006/0209012 A1 | 9/2006 | Hagood |
| 2006/0209385 A1 | 9/2006 | Liu et al. |
| 2006/0215958 A1 | 9/2006 | Yeo |
| 2006/0227532 A1 | 10/2006 | Ko et al. |
| 2006/0246233 A1 | 11/2006 | Fukuda |
| 2006/0250335 A1 | 11/2006 | Stewart et al. |
| 2006/0250350 A1 | 11/2006 | Kothari et al. |
| 2006/0250676 A1 | 11/2006 | Hagood, IV et al. |
| 2006/0262562 A1 | 11/2006 | Fukasawa et al. |
| 2006/0265919 A1 | 11/2006 | Huang |
| 2006/0274243 A1 | 12/2006 | Iijima et al. |
| 2006/0279558 A1 | 12/2006 | Van Delden et al. |
| 2006/0286381 A1 | 12/2006 | Naito et al. |
| 2006/0290253 A1 | 12/2006 | Yeo et al. |
| 2006/0291769 A1 | 12/2006 | Spoonhower et al. |
| 2007/0018585 A1 | 1/2007 | Ijzerman et al. |
| 2007/0036492 A1 | 2/2007 | Lee |
| 2007/0042524 A1 | 2/2007 | Kogut et al. |
| 2007/0064294 A1 | 3/2007 | Hoshino et al. |
| 2007/0070270 A1 | 3/2007 | Yu et al. |
| 2007/0097694 A1 | 5/2007 | Faase et al. |
| 2007/0114523 A1 | 5/2007 | Oumi et al. |
| 2007/0116424 A1 | 5/2007 | Ting et al. |
| 2007/0125415 A1 | 6/2007 | Sachs |
| 2007/0132843 A1 | 6/2007 | Miles |
| 2007/0133935 A1 | 6/2007 | Fine |
| 2007/0134438 A1 | 6/2007 | Fabick et al. |
| 2007/0146887 A1 | 6/2007 | Ikeda et al. |
| 2007/0147087 A1 | 6/2007 | Parker et al. |
| 2007/0171330 A1 | 7/2007 | Hung et al. |
| 2007/0187852 A1 | 8/2007 | Parker et al. |
| 2007/0201056 A1 | 8/2007 | Cok et al. |
| 2007/0201234 A1 | 8/2007 | Ottermann |
| 2007/0210163 A1 | 9/2007 | Han |
| 2007/0229737 A1 | 10/2007 | Takeda |
| 2007/0229936 A1 | 10/2007 | Miles |
| 2007/0241340 A1 | 10/2007 | Pan |
| 2007/0247704 A1 | 10/2007 | Mignard |
| 2007/0279727 A1 | 12/2007 | Gandhi et al. |
| 2007/0279935 A1 | 12/2007 | Gardiner et al. |
| 2007/0291362 A1 | 12/2007 | Hill et al. |
| 2008/0030650 A1 | 2/2008 | Kitagawa et al. |
| 2008/0037281 A1 | 2/2008 | Chang |
| 2008/0042154 A1 | 2/2008 | Wano |
| 2008/0084600 A1 | 4/2008 | Bita et al. |
| 2008/0089063 A1 | 4/2008 | Chen |

(56) References Cited

U.S. PATENT DOCUMENTS

| | | |
|---|---|---|
| 2008/0090025 A1 | 4/2008 | Freking et al. |
| 2008/0137175 A1 | 6/2008 | Lin |
| 2008/0192259 A1 | 8/2008 | Sumiyama |
| 2008/0192484 A1 | 8/2008 | Lee et al. |
| 2008/0232135 A1 | 9/2008 | Kinder et al. |
| 2008/0239216 A1 | 10/2008 | Miyamoto et al. |
| 2008/0266333 A1 | 10/2008 | Silverstein et al. |
| 2008/0278796 A1 | 11/2008 | Roosendaal et al. |
| 2008/0285308 A1 | 11/2008 | Clary et al. |
| 2009/0050454 A1 | 2/2009 | Matsukawa et al. |
| 2009/0073540 A1 | 3/2009 | Kothari et al. |
| 2009/0086301 A1 | 4/2009 | Gally et al. |
| 2009/0086466 A1 | 4/2009 | Sugita et al. |
| 2009/0090611 A1 | 4/2009 | Zeijlon et al. |
| 2009/0096956 A1 | 4/2009 | Uehara et al. |
| 2009/0101192 A1 | 4/2009 | Kothari et al. |
| 2009/0101623 A1 | 4/2009 | Bita et al. |
| 2009/0103161 A1 | 4/2009 | Kothari et al. |
| 2009/0103165 A1 | 4/2009 | Kothari et al. |
| 2009/0103166 A1 | 4/2009 | Khazeni et al. |
| 2009/0103311 A1 | 4/2009 | Wu et al. |
| 2009/0126777 A1 | 5/2009 | Khazeni et al. |
| 2009/0126792 A1 | 5/2009 | Gruhlke |
| 2009/0151771 A1 | 6/2009 | Kothari et al. |
| 2009/0168459 A1 | 7/2009 | Holman et al. |
| 2009/0190373 A1 | 7/2009 | Bita et al. |
| 2009/0196068 A1 | 8/2009 | Wang et al. |
| 2009/0199893 A1 | 8/2009 | Bita et al. |
| 2009/0199900 A1 | 8/2009 | Bita et al. |
| 2009/0201565 A1 | 8/2009 | Bita et al. |
| 2009/0201571 A1* | 8/2009 | Gally et al. .................. 359/315 |
| 2009/0213298 A1 | 8/2009 | Mimura et al. |
| 2009/0225394 A1 | 9/2009 | Chui et al. |
| 2009/0225396 A1 | 9/2009 | Sampsell |
| 2009/0231275 A1 | 9/2009 | Odgers |
| 2009/0231877 A1 | 9/2009 | Mienko et al. |
| 2009/0242024 A1 | 10/2009 | Kothari et al. |
| 2009/0244690 A1 | 10/2009 | Lee |
| 2009/0251752 A1 | 10/2009 | Gruhlke et al. |
| 2009/0255569 A1 | 10/2009 | Sampsell et al. |
| 2009/0257108 A1 | 10/2009 | Gruhlke et al. |
| 2009/0293955 A1 | 12/2009 | Kothari et al. |
| 2009/0293995 A1 | 12/2009 | Tanaka et al. |
| 2009/0294785 A1 | 12/2009 | Cok |
| 2009/0296193 A1 | 12/2009 | Bita et al. |
| 2009/0303417 A1 | 12/2009 | Mizushima et al. |
| 2009/0323144 A1 | 12/2009 | Gruhlke et al. |
| 2009/0323153 A1 | 12/2009 | Sampsell |
| 2010/0026727 A1 | 2/2010 | Bita et al. |
| 2010/0033988 A1 | 2/2010 | Chiu et al. |
| 2010/0039832 A1 | 2/2010 | Ahlgren et al. |
| 2010/0052880 A1 | 3/2010 | Laitinen et al. |
| 2010/0096006 A1 | 4/2010 | Griffiths et al. |
| 2010/0096011 A1 | 4/2010 | Griffiths et al. |
| 2010/0110340 A1 | 5/2010 | Mather et al. |
| 2010/0118239 A1 | 5/2010 | Roosendaal et al. |
| 2010/0172012 A1 | 7/2010 | Sampsell |
| 2010/0182308 A1 | 7/2010 | Holman et al. |
| 2010/0188367 A1 | 7/2010 | Nagafuji et al. |
| 2010/0195310 A1 | 8/2010 | Baar |
| 2010/0214642 A1 | 8/2010 | Miles |
| 2010/0226118 A1 | 9/2010 | Baar |
| 2010/0238529 A1 | 9/2010 | Sampsell et al. |
| 2010/0245370 A1 | 9/2010 | Narayanan et al. |
| 2010/0245975 A1 | 9/2010 | Cummings |
| 2010/0278480 A1 | 11/2010 | Vasylyev |
| 2010/0302616 A1 | 12/2010 | Bita et al. |
| 2010/0302802 A1 | 12/2010 | Bita et al. |
| 2010/0302803 A1 | 12/2010 | Bita et al. |
| 2010/0309103 A1 | 12/2010 | Sampsell |
| 2010/0309540 A1 | 12/2010 | Miles |
| 2011/0025727 A1 | 2/2011 | Li et al. |
| 2011/0032214 A1 | 2/2011 | Gruhlke et al. |
| 2011/0043889 A1 | 2/2011 | Mignard |
| 2011/0075246 A1 | 3/2011 | Wang |
| 2011/0157058 A1 | 6/2011 | Bita et al. |
| 2011/0157093 A1 | 6/2011 | Bita et al. |
| 2011/0199667 A1 | 8/2011 | Wang et al. |
| 2011/0199669 A1 | 8/2011 | Chui |
| 2011/0316861 A1 | 12/2011 | Gally et al. |
| 2012/0002265 A1 | 1/2012 | Kothari |
| 2012/0069031 A1* | 3/2012 | Bita et al. ...................... 345/520 |
| 2012/0081406 A1 | 4/2012 | Li et al. |
| 2012/0099177 A1 | 4/2012 | Chui et al. |
| 2012/0154881 A1 | 6/2012 | Gruhlke et al. |
| 2012/0206788 A1 | 8/2012 | Sampsell |
| 2013/0106712 A1 | 5/2013 | Cummings et al. |
| 2013/0127922 A1 | 5/2013 | Poliakov et al. |

FOREIGN PATENT DOCUMENTS

| | | |
|---|---|---|
| CN | 1272922 | 11/2000 |
| CN | 1286424 | 3/2001 |
| CN | 1381752 A | 11/2002 |
| CN | 1384392 | 12/2002 |
| CN | 1409157 A | 4/2003 |
| CN | 1420703 A | 5/2003 |
| CN | 1447887 A | 10/2003 |
| CN | 2624220 Y | 7/2004 |
| CN | 1517743 A | 8/2004 |
| CN | 1559000 | 12/2004 |
| CN | 1639596 | 7/2005 |
| CN | 1643439 A | 7/2005 |
| CN | 1670593 | 9/2005 |
| CN | 1744163 | 3/2006 |
| CN | 1795403 | 6/2006 |
| CN | 1811549 A | 8/2006 |
| DE | 3402746 | 8/1985 |
| DE | 19622748 | 12/1997 |
| DE | 19942513 A1 | 3/2001 |
| DE | 10228946 A1 | 1/2004 |
| DE | 10329917 | 2/2005 |
| DE | 102007025092 A1 | 12/2008 |
| EP | 0223136 A2 | 5/1987 |
| EP | 0278038 A1 | 8/1988 |
| EP | 0389031 A1 | 9/1990 |
| EP | 0539099 A2 | 4/1993 |
| EP | 0590511 A1 | 4/1994 |
| EP | 0621500 A1 | 10/1994 |
| EP | 0667548 A1 | 8/1995 |
| EP | 0786911 A2 | 7/1997 |
| EP | 0822441 A2 | 2/1998 |
| EP | 0830032 A2 | 3/1998 |
| EP | 0855745 A2 | 7/1998 |
| EP | 0867747 A2 | 9/1998 |
| EP | 0 879 991 | 11/1998 |
| EP | 0895274 A1 | 2/1999 |
| EP | 0907050 A1 | 4/1999 |
| EP | 0957392 A1 | 11/1999 |
| EP | 0 984 314 | 3/2000 |
| EP | 1003062 A1 | 5/2000 |
| EP | 1014161 A1 | 6/2000 |
| EP | 1081633 A2 | 3/2001 |
| EP | 1089115 A1 | 4/2001 |
| EP | 1093105 A1 | 4/2001 |
| EP | 1116987 A2 | 7/2001 |
| EP | 1 122 586 | 8/2001 |
| EP | 1127984 A1 | 8/2001 |
| EP | 1143270 A2 | 10/2001 |
| EP | 1 199 512 | 4/2002 |
| EP | 1231757 A2 | 8/2002 |
| EP | 1251454 A2 | 10/2002 |
| EP | 1 279 892 | 1/2003 |
| EP | 1271223 A2 | 1/2003 |
| EP | 1296094 A1 | 3/2003 |
| EP | 1298635 A2 | 4/2003 |
| EP | 1306609 A1 | 5/2003 |
| EP | 1 329 664 | 7/2003 |
| EP | 1336876 A1 | 8/2003 |
| EP | 1 347 315 | 9/2003 |
| EP | 1341025 A1 | 9/2003 |
| EP | 1389775 A2 | 2/2004 |
| EP | 1413543 A1 | 4/2004 |
| EP | 1437610 A1 | 7/2004 |

(56) References Cited

FOREIGN PATENT DOCUMENTS

| | | |
|---|---|---|
| EP | 1450418 A2 | 8/2004 |
| EP | 1519218 A1 | 3/2005 |
| EP | 1531302 A1 | 5/2005 |
| EP | 1544537 A1 | 6/2005 |
| EP | 1577701 A1 | 9/2005 |
| EP | 1670065 A1 | 6/2006 |
| EP | 1698918 A1 | 9/2006 |
| EP | 1734401 A1 | 12/2006 |
| EP | 1 748 305 | 1/2007 |
| EP | 1780585 A2 | 5/2007 |
| EP | 1947551 A2 | 7/2008 |
| EP | 2141408 A2 | 1/2010 |
| EP | 2163920 A1 | 3/2010 |
| EP | 2251731 A1 | 11/2010 |
| EP | 2259122 | 12/2010 |
| EP | 2259123 | 12/2010 |
| EP | 2264508 | 12/2010 |
| EP | 2264509 | 12/2010 |
| EP | 2264510 | 12/2010 |
| EP | 2366942 | 9/2011 |
| EP | 2366943 | 9/2011 |
| EP | 2366944 | 9/2011 |
| EP | 2366945 | 9/2011 |
| EP | 2366946 | 9/2011 |
| EP | 2388234 A1 | 11/2011 |
| GB | 2260203 A | 4/1993 |
| GB | 2278222 | 11/1994 |
| GB | 2315356 A | 1/1998 |
| GB | 2321532 A | 7/1998 |
| GB | 2336933 | 11/1999 |
| GB | 2340281 | 2/2000 |
| GB | 2 351 834 | 1/2001 |
| JP | 56010976 | 2/1981 |
| JP | 56010977 | 2/1981 |
| JP | 56088111 | 7/1981 |
| JP | 573266 | 1/1982 |
| JP | 58115781 | 7/1983 |
| JP | 60147718 | 8/1985 |
| JP | 60165621 A | 8/1985 |
| JP | 60242408 A | 12/1985 |
| JP | 62009317 | 1/1987 |
| JP | 56395489 A | 4/1988 |
| JP | 2068513 A | 3/1990 |
| JP | 02151079 | 6/1990 |
| JP | 3199920 A | 8/1991 |
| JP | 04081816 | 3/1992 |
| JP | 4053220 U | 5/1992 |
| JP | 04190323 | 7/1992 |
| JP | 04238321 | 8/1992 |
| JP | 05281479 | 10/1993 |
| JP | 6209114 A | 7/1994 |
| JP | 6265870 A | 9/1994 |
| JP | 07509327 | 10/1995 |
| JP | 8018990 A | 1/1996 |
| JP | 8050283 A | 2/1996 |
| JP | 08094992 | 4/1996 |
| JP | 8271874 A | 10/1996 |
| JP | 9005735 A | 1/1997 |
| JP | 09022012 | 1/1997 |
| JP | 09068722 | 3/1997 |
| JP | 09 171111 | 6/1997 |
| JP | 09160032 | 6/1997 |
| JP | 09189869 A | 7/1997 |
| JP | 09189910 A | 7/1997 |
| JP | 09507920 | 8/1997 |
| JP | 9230324 A | 9/1997 |
| JP | 09260696 | 10/1997 |
| JP | 09281917 | 10/1997 |
| JP | 09307140 | 11/1997 |
| JP | 09311333 | 12/1997 |
| JP | 10096910 A | 4/1998 |
| JP | 10186249 A | 7/1998 |
| JP | 10202948 | 8/1998 |
| JP | 10325953 A | 12/1998 |
| JP | 11002712 A | 1/1999 |
| JP | 11002764 A | 1/1999 |
| JP | 11052887 A | 2/1999 |
| JP | 11064836 A | 3/1999 |
| JP | 11064882 A | 3/1999 |
| JP | 11072721 A | 3/1999 |
| JP | 11160687 | 6/1999 |
| JP | 11167808 A | 6/1999 |
| JP | 11174234 | 7/1999 |
| JP | 11184387 A | 7/1999 |
| JP | 11 211999 | 8/1999 |
| JP | 11232919 | 8/1999 |
| JP | 11249132 A | 9/1999 |
| JP | 11254752 A | 9/1999 |
| JP | 11258558 A | 9/1999 |
| JP | 11295725 | 10/1999 |
| JP | 11295726 A | 10/1999 |
| JP | 11 326898 | 11/1999 |
| JP | 11316553 A | 11/1999 |
| JP | 11326903 A | 11/1999 |
| JP | 2000028933 A | 1/2000 |
| JP | 2000 081848 | 3/2000 |
| JP | 2000075287 A | 3/2000 |
| JP | 2000075293 A | 3/2000 |
| JP | 2000089225 A | 3/2000 |
| JP | 2000147262 A | 5/2000 |
| JP | 2000 181367 | 6/2000 |
| JP | 2000193933 A | 7/2000 |
| JP | 2000214804 A | 8/2000 |
| JP | 2000258622 A | 9/2000 |
| JP | 2000514568 | 10/2000 |
| JP | 2000 314882 | 11/2000 |
| JP | 2000305074 | 11/2000 |
| JP | 2000338310 A | 12/2000 |
| JP | 2001 021883 | 1/2001 |
| JP | 2001110218 A | 4/2001 |
| JP | 2001222276 A | 8/2001 |
| JP | 2001 297615 | 10/2001 |
| JP | 2001283622 A | 10/2001 |
| JP | 2001305312 | 10/2001 |
| JP | 2001324606 A | 11/2001 |
| JP | 2001343514 | 12/2001 |
| JP | 2001345458 | 12/2001 |
| JP | 2002014344 A | 1/2002 |
| JP | 2002040339 A | 2/2002 |
| JP | 2002042525 A | 2/2002 |
| JP | 2002062505 A | 2/2002 |
| JP | 2002071965 A | 3/2002 |
| JP | 2002072284 A | 3/2002 |
| JP | 2002090549 | 3/2002 |
| JP | 2002 108227 | 4/2002 |
| JP | 2002098838 A | 4/2002 |
| JP | 2002124113 A | 4/2002 |
| JP | 2002131551 A | 5/2002 |
| JP | 2002139630 A | 5/2002 |
| JP | 2002 174780 | 6/2002 |
| JP | 2002208307 A | 7/2002 |
| JP | 2002523798 | 7/2002 |
| JP | 2002229023 A | 8/2002 |
| JP | 2002236290 A | 8/2002 |
| JP | 2002245835 A | 8/2002 |
| JP | 2002287047 A | 10/2002 |
| JP | 2002297044 | 10/2002 |
| JP | 2002328313 A | 11/2002 |
| JP | 2002365438 A | 12/2002 |
| JP | 2003007114 A | 1/2003 |
| JP | 2003021821 A | 1/2003 |
| JP | 2003057652 | 2/2003 |
| JP | 2003057653 A | 2/2003 |
| JP | 2003066236 A | 3/2003 |
| JP | 2003066451 | 3/2003 |
| JP | 2003131215 | 5/2003 |
| JP | 2003140118 A | 5/2003 |
| JP | 2003147351 A | 5/2003 |
| JP | 2003149642 | 5/2003 |
| JP | 2003149643 | 5/2003 |
| JP | 2003173713 A | 6/2003 |
| JP | 2003177336 A | 6/2003 |
| JP | 2003177405 A | 6/2003 |
| JP | 2003186008 A | 7/2003 |

(56) References Cited

FOREIGN PATENT DOCUMENTS

| | | |
|---|---|---|
| JP | 2003188959 A | 7/2003 |
| JP | 2003195201 A | 7/2003 |
| JP | 2003202568 A | 7/2003 |
| JP | 2003222861 A | 8/2003 |
| JP | 2003248181 A | 9/2003 |
| JP | 2003255140 A | 9/2003 |
| JP | 2003255344 A | 9/2003 |
| JP | 2003315560 A | 11/2003 |
| JP | 2003315694 A | 11/2003 |
| JP | 2003 344881 | 12/2003 |
| JP | 2004012918 | 1/2004 |
| JP | 2004062099 | 2/2004 |
| JP | 2004070189 A | 3/2004 |
| JP | 2004086221 A | 3/2004 |
| JP | 2004087409 A | 3/2004 |
| JP | 2004111278 A | 4/2004 |
| JP | 2004126196 A | 4/2004 |
| JP | 2004510185 | 4/2004 |
| JP | 2004145109 A | 5/2004 |
| JP | 2004199006 A | 7/2004 |
| JP | 2004212673 A | 7/2004 |
| JP | 2004219843 A | 8/2004 |
| JP | 2005031219 A | 2/2005 |
| JP | 2005135899 A | 5/2005 |
| JP | 2005308871 A | 11/2005 |
| JP | 2005316178 | 11/2005 |
| JP | 2006039056 A | 2/2006 |
| JP | 2006065360 | 3/2006 |
| JP | 2006 099061 | 4/2006 |
| JP | 2006 099113 | 4/2006 |
| JP | 2006107993 | 4/2006 |
| JP | 2006 133743 | 5/2006 |
| JP | 2006120571 | 5/2006 |
| JP | 2007027150 A | 2/2007 |
| JP | 2007218540 A | 8/2007 |
| JP | 2008514992 | 5/2008 |
| JP | 2009300966 A | 12/2009 |
| JP | 2010 156979 | 7/2010 |
| KR | 20020010322 | 2/2002 |
| KR | 100329769 | 3/2002 |
| KR | 20030029769 | 4/2003 |
| KR | 102003002964 | 4/2003 |
| KR | 20030081662 | 10/2003 |
| KR | 20040016570 A | 2/2004 |
| TW | 412646 B | 11/2000 |
| TW | 552720 B | 9/2003 |
| TW | 556009 B | 10/2003 |
| TW | 567388 | 12/2003 |
| TW | 579368 B | 3/2004 |
| TW | 200500717 | 1/2005 |
| TW | 200512518 | 4/2005 |
| WO | WO-9406871 A1 | 3/1994 |
| WO | WO-9501584 A1 | 1/1995 |
| WO | WO-9514256 A1 | 5/1995 |
| WO | WO-9515582 A1 | 6/1995 |
| WO | WO-9608833 A1 | 3/1996 |
| WO | WO-9701240 A1 | 1/1997 |
| WO | WO-9716756 A1 | 5/1997 |
| WO | WO-9744707 A2 | 11/1997 |
| WO | WO-9746908 A1 | 12/1997 |
| WO | WO 98/19201 | 5/1998 |
| WO | WO-9832047 A1 | 7/1998 |
| WO | WO-9835182 A1 | 8/1998 |
| WO | WO-9852094 A1 | 11/1998 |
| WO | WO-9904296 A1 | 1/1999 |
| WO | WO-9963394 A1 | 12/1999 |
| WO | WO-9967678 A2 | 12/1999 |
| WO | WO-9967680 A1 | 12/1999 |
| WO | WO-0011502 A1 | 3/2000 |
| WO | WO 00/50807 | 8/2000 |
| WO | WO-0157434 A1 | 8/2001 |
| WO | WO 01/84229 | 11/2001 |
| WO | WO-0181994 A1 | 11/2001 |
| WO | WO-0184228 A1 | 11/2001 |
| WO | WO-0190637 A1 | 11/2001 |
| WO | WO-0206858 A2 | 1/2002 |
| WO | WO-0224570 A1 | 3/2002 |
| WO | WO-02071132 A2 | 9/2002 |
| WO | WO-02097324 A1 | 12/2002 |
| WO | WO 03/007049 | 1/2003 |
| WO | WO 03/027569 | 4/2003 |
| WO | WO-03032058 A1 | 4/2003 |
| WO | WO-03038509 A2 | 5/2003 |
| WO | WO 03/062912 | 7/2003 |
| WO | WO-03075207 A2 | 9/2003 |
| WO | WO-03105198 A1 | 12/2003 |
| WO | WO-2004003643 A1 | 1/2004 |
| WO | WO 2004/015489 | 2/2004 |
| WO | WO-2004012004 A1 | 2/2004 |
| WO | WO-2004027514 A2 | 4/2004 |
| WO | WO-2004036270 A1 | 4/2004 |
| WO | WO-2004036294 A2 | 4/2004 |
| WO | WO-2004068460 A1 | 8/2004 |
| WO | WO-2004088372 A1 | 10/2004 |
| WO | WO-2004114418 A1 | 12/2004 |
| WO | WO-2005011012 A1 | 2/2005 |
| WO | WO-2005088367 A1 | 9/2005 |
| WO | WO 2005/111669 | 11/2005 |
| WO | WO-2006008702 A2 | 1/2006 |
| WO | WO-2006026743 A1 | 3/2006 |
| WO | WO 2006/036451 | 4/2006 |
| WO | WO-2006036440 | 4/2006 |
| WO | WO-2006036496 | 4/2006 |
| WO | WO-2006036519 | 4/2006 |
| WO | WO-2006137337 | 12/2006 |
| WO | WO 2007/053308 | 5/2007 |
| WO | WO-2007073203 A1 | 6/2007 |
| WO | WO-2007094558 A1 | 8/2007 |
| WO | WO 2008/045207 | 4/2008 |
| WO | WO-2008045311 | 4/2008 |
| WO | WO-2008045363 | 4/2008 |
| WO | WO-2008045364 A2 | 4/2008 |
| WO | WO-2008045462 | 4/2008 |
| WO | WO-2008045463 | 4/2008 |
| WO | WO-2008145096 A1 | 12/2008 |
| WO | WO-2009065069 A1 | 5/2009 |
| WO | WO-2012043396 A1 | 4/2012 |

OTHER PUBLICATIONS

International Preliminary Report on Patentability in International Patent Application No. PCT/US2007/020736 (International Publication No. WO 2008/045207) dated Dec. 30, 2008.
Abileah A, "Optical Tiled AMLCD for Very Large Display Applications," SID International Symposium Digest of Papers, Boston, 1992, 945-949.
"ABS 407 Visible Narrow Band Absorber," downloaded from http://www.exciton.com/pdfs/ABS407.pdf on Feb. 8, 2011, in 1 page.
Akasaka Y., "Three-Dimensional IC Trends," Proceedings of IEEE, 1986, vol. 74 (12), pp. 1703-1714.
Aratani K, et al., "Process and Design Considerations for Surface Micromachined Beams for a Tuneable Interferometer Array in Silicon," Proc. IEEE Microelectromechanical workshop fort Lauderdale FL, 1993, 230-235.
Aratani K. et al., "Surface Micromachined Tuneable Interferometer Array," Sensors and Actuators A, Elsevier Sequoia S.A., Lausanne, CH, A, 1993, 43(1/3), 17-23.
Austrian Search Report for U.S. Appl. No. 11/036,965 dated Jul. 25, 2005 (Publication No. 2005/0179977).
Austrian Search Report for U.S. Appl. No. 11/040,824 dated Jul. 14, 2005 (Publication No. 2006/077522).
Austrian Search Report for U.S. Appl. No. 11/052,004 dated Jul. 1, 2005 (Publication No. 2006/077509).
Austrian Search Report for U.S. Appl. No. 11/057,392 dated May 12, 2005 (Publication No. 2006/077510).
Austrian Search Report for U.S. Appl. No. 11/064,143 dated Aug. 12, 2005.
Austrian Search Report for U.S. Appl. No. 11/051,258 dated May 13, 2005.
Austrian Search Report for U.S. Appl. No. 11/077,974 dated Jul. 14, 2005.

(56) References Cited

OTHER PUBLICATIONS

Austrian Search Report in U.S. Appl. No. 11/041,020 dated May 9, 2005.
Billard C, "Tunable Capacitor," 5th Annual Review of LETI, 2003, p. 7.
Brosnihan, et al., "Optical iMEMS—A Fabrication Process for MEMS Optical Switches With Integrated On-Chip Electronics," 12th International Conference on Transducers, Solid-State Sensors, Actuators and Microsystems, 2003, vol. 2, pp. 1638-1642.
Cacharelis, et al., "A Reflective-Mode PDLC Light Valve Display Technology," Proceedings of European Solid State Device Research Conference (ESSDERC), 1997, pp. 596-599.
Chemical Properties Handbook, McGraw-Hill, 1999, Refractive Index, Dipole Moment and Radius of Gyration; Inorganic Compounds, No. 151: O2Si, in 1 page.
Conner, "Hybrid Color Display using Optical Interference Filter Array," SID Digest, 1993, 577-580.
U.S. Appl. No. 13/494,897, filed on Jun. 12, 2012.
U.S. Appl. No. 13/494,898, filed on Jun. 12, 2012.
Demiryont, et al., "Innovative Transparent Electrode for Flexible Displays," Defense, Security, Cockpit and Future Display II, Proc. Of SPIE, Apr. 2006, vol. 6225, pp. 622519-1 to 622519-9.
Dewitt S, "Integrating Touch Screens and Optical Films When Where and How," 3M Touch Systems Society for Information Display, Americas Display Engineering & Applications Conference, Oct. 24-27, 2005, Portland, Oregon U.S.A, pp. 219-221.
Dokmeci, et al., "Two-Axis Single-Crytal Silicon Micromirror Arrays," Journal of Microelectromechanical Systems, Dec. 2004, 13(6), 1006-1017.
Fan, et al., "Channel Drop Filters in Photonic Crystals," Optics Express, 1998, vol. 3(1), pp. 4-11.
Feenstra, et al., "Electrowetting displays," Liquavista BV, Jan. 2006, 16 pp.
Giles, et al., "A Silicon Mems Optical Switch Attenuator and its Use in Lightwave Subsystems," IEEE Journal of Selected Topics in Quantum Electronics, 1999, 5 (1), 18-25.
"Glass Polarizing and Interference Filters," American Institute of Physics Handbook, 1982, pp. 6-172 to 6-178.
Gokturk, et al., "A Time-Of-Flight Depth Sensor—System Description, Issues and Solutions," 2004 Conference on Computer Vision and Pattern Recognition workshop (CVPRW'04), 2004, 3, 35-42.
Goossen, et al., "Silicon Modulator Based On Mechnically-Active Anti-Reflection Layer With 1Mbit/Sec Capability for Fiber-In-The-Loop Applications," IEEE Photonics Technology Letters, 1994, 1119-1121.
Goossen K.W. et al., "Possible Display Applications of the Silicon Mechanical Antireflection Switch," Society for Information Display, 1994, in 4 pages.
Goossen K.W., "MEMS-Based Variable Optical Interference Devices," IEEE/Lens International Conference on Optical Mems, Conference Digest, Piscataway, NJ, USA, IEEE Aug. 21, 2000, pp. 17-18.
Gosch, "West Germany Grabs the Lead in X-Ray Lithography," Electronics, 1987, 78-80.
Hohlfeld, et al., "Micro-Machined Tunable Optical Filters With Optimized Band-Pass Spectrum," 12th International Conference on Transducers, Solid-State Sensors, Actuators and Microsystems, 2003, vol. 2, 1494-1497.
Howard, et al., "Nanometer-Scale Fabrication Techniques," VLSI Electronics: Microstructure Science, 1982, vol. 5, 145-153, 166-173.
Huang, et al., "Multidirectional Asymmetrical Microlens-Array Light Control Films for High Performance Reflective Liquid Crystal Displays," SID Digest, 2002, pp. 870-873.
Imenes, et al., "Spectral Beam Splitting Technology for Increased Conversion Efficiency in Solar Concentrating Systems a Review," Solar Energy Materials, Elsevier Science, Publishers B.V. Amsterdam, NL, Oct. 1, 2004, vol. 84, pp. 19-69, XP002474546.
Jackson, "Classical Electrodynamics," John Wiley & Sons Inc, 1962, pp. 568-573.
Jerman, et al., "A Miniature Fabry-Perot Interferometer Fabricated Using Silicon Micromachining Techniques," IEEE Electron Devices Society, 1988, in 3 pages.
Jerman et al., "A Miniature Fabry-Perot Interferometer with a Corrugated Silicon Diaphragm Support", IEEE Electron Devices Society, pp. 140-144, 1990.
Jerman, et al., "Miniature Fabry-Perot Interferometers Micromachined in Silicon for use in Optical Fiber WDM Systems," Transducers, Proceedings on the International Conference on Solid State Sensors and Actuators, 1991, vol. ConF. 6, San Francisco, 372-375.
Johnson, "Optical Scanners," Microwave Scanning Antennas, 1964, vol. 1(2), 251-261.
Kowarz, et al., "Conformal Grating Electromechanical System (Gems) for High-Speed Digital Light Modulation," Proceedings of the IEEE 15th Annual International Conference on Micro Electro Mechanical Systems, MEMS 2002, pp. 568-573.
Lau, "The Characterization of Silicon Dioxide and Silicon Nitride Thin Films, in Infrared Characterization for Microelectronics," World Scientific Publishing Co. Pte. Ltd., New Jersey, 1999, 5, pp. 55-71.
Lezec, "Submicrometer Dimple Array Based Interference Color Field Displays and Sensors," Nano Letters, 2006, 7(2), 329-333.
Light Over Matter Circle No. 36, Jun. 1993, in 1 page.
Lin, et al., "Development of UV Stable LED Encapsulants," Microsystems, Packaging, Assembly and Circuits Technology Conference, Impact 2009, 4th, 565-567.
Little, et al., "Vertically Coupled Glass Microring Resonator Channel Dropping Filters," IEEE Photonics Technology Letters, 1999, 11(2), 215-217.
Londergan, et al., "Advanced processes for MEMS-based displays," Proceedings of the Asia Display, 2007, SID, 1, 107-112.
Longhurst R.S., "Geometrical and Physical Optics", Chapter IX: Multiple Beam Interferometry, pp. 153-157, 1963.
Maeda, et al., "A Study of A High Quality Front Lighting System for Reflective Full-Color Liquid Crystal Displays," Record of Electrical and Communication, Engineering Conversazione Tohoku University, Sep. 2009, v 78(1), 415-416, ISSN: 0385-7719.
Magel G.A., "Integrated Optic Devices using Micromachined Metal Membranes," SPIE, 1996, vol. 2686, 54-63.
Maier et al., 1996 1 .3' ActiveMatrix liquid crystal spatial light modulator with 508 dpi resolution, SPIE vol. 2754, pp. 171-179.
Mehregany, et al., "MEMS Applications in Optical Systems," IEEE/LEOS 1996 Summer Topical Meetings, 1996, 75-76.
Miles M., et al., "Digital Paper (TM) for reflective displays", Journal of the Society for Information Display, Society for Information Display, vol. 11 (1), pp. 209-215, 2003, XP002358929, ISSN: 1071-0922.
Miles M.W., "A MEMS Based Interferometric Modulator (IMOD) for Display Applications" Proceedings of Sensors Expo, Oct. 21, 1997 © 1997 Helmer's Publishing, Inc., pp. 281-284 XP009058455.
Miles M.W., "A New Reflective FPD Technology using Interferometric Modulation," Journal of the SID, 1997, vol. 5(4), 379-382.
Miles M.W., et al., "Interferometric Modulation MOEMS as an enabling technology for high-performance reflective displays," Proceedings of the SPIE, 2003, 4985, 131-139.
Nakagawa et al., "Wide-Field -of-View Narrow-Band Spectral Filters Based on Photonic Crystal Nanocavities", Optical Society of America, Optics Letters, vol. 27, No. 3, pp. 191-193, Feb. 1, 2002.
Neal T.D. et al., "Surface Plasmon Enhanced Emission From Dye Doped Polymer Layers," Optics Express Opt. Soc. America, USA, Jul. 11, 2005,vol. 13(14), 5522-5527.
Newsbreaks, "Quantum-trench devices might operated at terahertz frequencies", Laser Focus World, May 1993, in 1 page.
Nieminen, et al., "Design of a Temperature-Stable RF MEMS Capacitor," Institute of Electrical and Electronics Engineers (IEEE) Journal of Microelectromechanical Systems, 2004, vol. 13(5), 705-714.
Obi et al., "Fabrication of Optical Mems in Sol/Gel Materials," IEEE/Leos International Conference on Optical Mems, 2002, Conference Digest, pp. 39-40.

(56) References Cited

OTHER PUBLICATIONS

Oliner, "Radiating Elements and Mutual Coupling," Microwave Scanning Antennas, 1966, vol. 2, 131-157 and pp. 190-194.
Pape, et al., "Characteristics of the Deformable Mirror Device for Optical Information Processing," Optical Engineering, Nov.-Dec. 1983, 22(6), 676-681.
Petschick, et.al., "Fabry-Perot-Interferometer," available at http://pl.physik.tuberlin.de/groups/pg279/protokolless02/04_fpi.pdf, pp. 50-60, May 14, 2002.
Qualcomm MEMS Technologies, Inc., May 2008, Interferometric Modulator (IMOD), Technology Overview, White Paper, 14 pp.
Raley, et al., "A Fabry-Perot Microinterferometer for Visible Wavelengths," IEEE Solid-State Sensor and Actuator Workshop, 1992, 170-173.
Sperger, et al., "High Performance Patterned All-Dielectric Interference Colour Filter for Display Applications," SID Digest, 1994, 81-83.
Stone J.M., "Radiation and Optics, an Introduction to the Classic Theory," 1963, McGraw-Hill, pp. 340-343.
Tai C.Y., et al., "A Transparent Front Lighting System for Reflective-type Displays," SID International Symposium Digest of Technical Papers, Orlando, SID International Symposium Digest of Technical Papers, Santa Ana, SID, vol. 26, 375-378, 1995, (XP000657155).
Taii Y. et al., "A Transparent Sheet Display by Plastic MEMS," Journal of the SID, 2006, vol. 14 (8), 735-741.
Tolansky, "Multiple-Beam Interference in Multiple-Beam Interferometry of Surfaces and Films," Chap II Oxford at the Clarendon Press, 1948, pp. 8-11.
Walker, et al., "Electron-Beam-Tunable Interference Filter Spatial Light Modulator," Optics Letters, 1988, vol. 13(5), 345-347.
Wang, et al., "Design and Fabrication of a Novel Two-Dimension Mems-Based Tunable Capacitor," IEEE International Conference on Communications, Circuits and Systems and West Sino Expositions, 2002, vol. 2, 1766-1769.
Winton et al., "A novel way to capture solar energy," Chemical Week, pp. 17-18 (May 15, 1985).
Wu, et al., "Design of a Reflective Color LCD using Optical Interference Reflectors," Asia Display, Changchun Institute of Physics, 1995, 929-931.
Zhou et al., "Waveguide Panel Display Using Electromechanism Spatial Modulators," SID Digest, 1998, vol. XXIX, in 4 pages.

\* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

DISPLAY DEVICE HAVING FRONT ILLUMINATOR WITH TURNING FEATURES

CROSS-REFERENCE TO RELATED APPLICATIONS

This application claims priority under 35 U.S.C. §119(e) to U.S. Provisional Application Ser. No. 60/850,025 filed on Oct. 6, 2006, which is hereby expressly incorporated by reference in its entirety.

BACKGROUND

1. Field

The present invention relates to microelectromechanical systems (MEMS).

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

Various embodiments described herein comprise light guides for distributing light across an array of display elements. The light guide may include surface relief features to turn light propagating in a light guide onto the array of display elements. The surface relief features may comprise facets that reflect light. To protect these facets, the facets are embedded within the light guide. Other embodiments are also disclosed.

One embodiment of the invention discloses a display device comprising a substrate having front and rear sides, a plurality of display elements on the rear side of the substrate, a plurality of turning features on the front side of the substrate and a diffuser on the front side of the substrate between the turning features and the substrate.

In one embodiment, a method of fabricating a display device is disclosed. The method of fabricating comprises providing a substrate having front and rear sides, forming a plurality of display elements on the rear side of the substrate, disposing a plurality of turning features on the front side of the substrate and disposing a diffuser on the front side of the substrate between the turning features and the substrate.

Another embodiment of the invention discloses a display device comprising means for displaying an image, means for supporting the displaying means during fabrication, the supporting means having front and rear sides, the displaying means disposed on the rear side of the supporting means, the supporting means configured to guide light between the front and rear sides. The display device further comprises means for turning the light guided in the supporting means toward the displaying means, the light turning means disposed on the front side of the supporting means and means for diffusing light disposed on the front side of the supporting means between the turning means and the supporting means.

An embodiment of the invention discloses a display device comprising a substrate having front and rear sides, a plurality of display elements on the rear side of the substrate, a plurality of turning features on the front side of the substrate and a diffuser between the substrate and the plurality of display elements.

In one embodiment, a method of fabricating a display device is disclosed comprising providing a substrate having front and rear sides, forming a plurality of display elements on the rear side of the substrate, disposing a plurality of turning features on the front side of the substrate and disposing a diffuser between the substrate and the plurality of display elements.

Another embodiment of the invention discloses a display device comprising means for displaying an image, means for supporting the displaying means during fabrication, the supporting means having front and rear sides, the displaying means disposed on the rear side of the supporting means, the supporting means configured to guide light between the front and rear sides. The display device further comprises means for turning the light guided in the supporting means toward the displaying means, the turning means disposed on the front side of the supporting means and means for diffusing light, the means for diffusing light disposed between the supporting means and the displaying means.

An alternate embodiment of the invention discloses a display device comprising a substrate having front and rear sides, a plurality of display elements on the rear side of the substrate, a plurality of turning features on the rear side of the substrate between the substrate and the plurality of display elements and a diffuser on the rear side of the substrate between the turning features and the plurality of display elements.

In one embodiment, a method of fabricating a display device is disclosed comprising providing a substrate having front and rear sides, forming a plurality of display elements on the rear side of the substrate, disposing plurality of turning features on the rear side of the substrate between the substrate and the plurality of display elements and disposing a diffuser on the rear side of the substrate between the turning features and the plurality of display elements.

Another embodiment of the invention discloses a display device comprising means for displaying an image, means for supporting the displaying means during fabrication, the supporting means having front and rear sides, the displaying means disposed on the rear side of the supporting means, the supporting means configured to guide light between the front and rear sides. The display device further comprises means for turning the light guided in the supporting means toward the displaying means, the turning means disposed on the rear side of the supporting means between the supporting means and the displaying means and means for diffusing said light, the diffusing means disposed on the rear side of the supporting means between the turning means and the displaying means.

One embodiment of the invention discloses a display device comprising a substrate having front and rear sides, a plurality of display elements on the rear side of the substrate, a plurality of turning features on the rear side of the substrate between the substrate and the plurality of display elements and an optical isolation layer on the rear side of the substrate between the turning features and the plurality of display elements.

In another embodiment, a method of fabricating a display device is disclosed comprising providing a substrate having front and rear sides, forming a plurality of display elements on the rear side of the substrate, disposing plurality of turning features on the rear side of the substrate between the substrate and the plurality of display elements and disposing an optical isolation layer on the rear side of the substrate between the turning features and the plurality of display elements.

Another embodiment of the invention discloses a display device comprising means for displaying an image, means for supporting the displaying means during fabrication, the supporting means having front and rear sides, the displaying means disposed on the rear side of the supporting means, the supporting means configured to guide light between the front and rear sides. The display device further comprises means for turning the light guided in the supporting means toward the displaying means, the turning means disposed on the rear side of the supporting means between the supporting means and the displaying means and means for optical isolating the displaying means from the supporting means, the means for optically isolating on the rear side of the supporting means between the turning means and the displaying means.

DETAILED DESCRIPTION OF THE DRAWINGS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In various embodiments described herein, the display device includes a front illumination device that comprises a light guide disposed forward of an array of display elements, such as an array of interferometric modulators, to distribute light across the array of display elements. For example, a light guide panel that includes a turning layer may be disposed in front of the array of display elements to deliver uniform illumination from a light source to the array of display elements while allowing for the option of illumination from ambient lighting of the array of display elements. For many portable display applications, however, it is important that the display be very thin. Accordingly, in various embodiments described herein, the light guide panel comprises the substrate used in fabricating the display elements. The light guide panel may include additional films as well. The light guide panel, for example, may include a turning layer deposited or laminated on the top or bottom surface of the glass substrate supporting the array of display elements. As a consequence, the overall thickness of the entire display is only slightly increased beyond that of the display elements themselves which are necessarily formed on a substrate. Certain embodiments include additional optical layers, such as a diffuser and/or an optical isolation layer to further enhance the optical imaging characteristics of the display.

Figure 1:
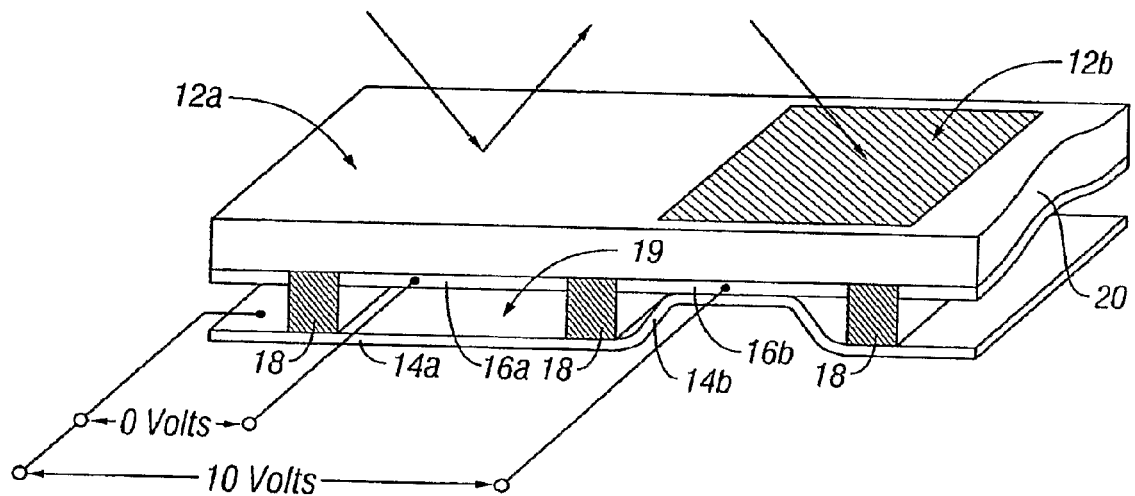
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
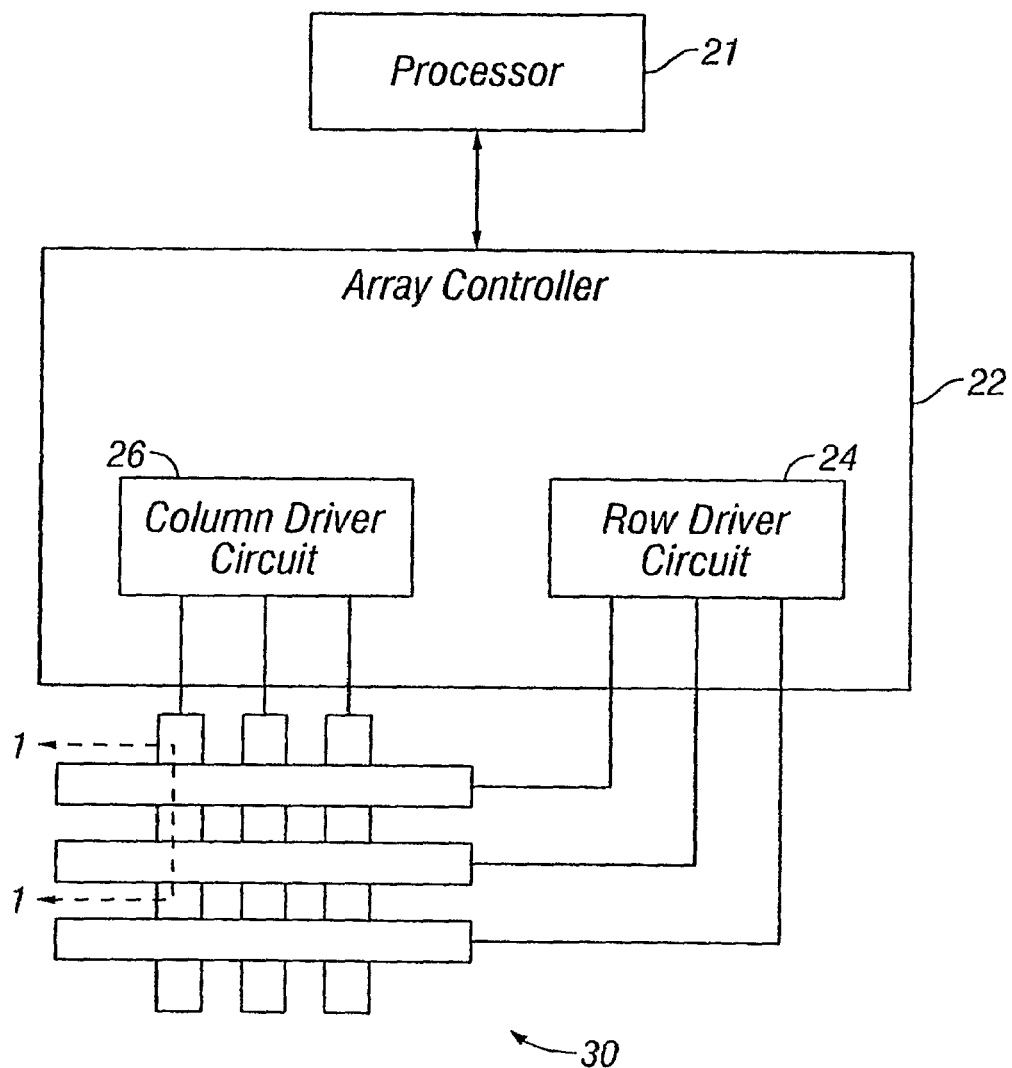
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
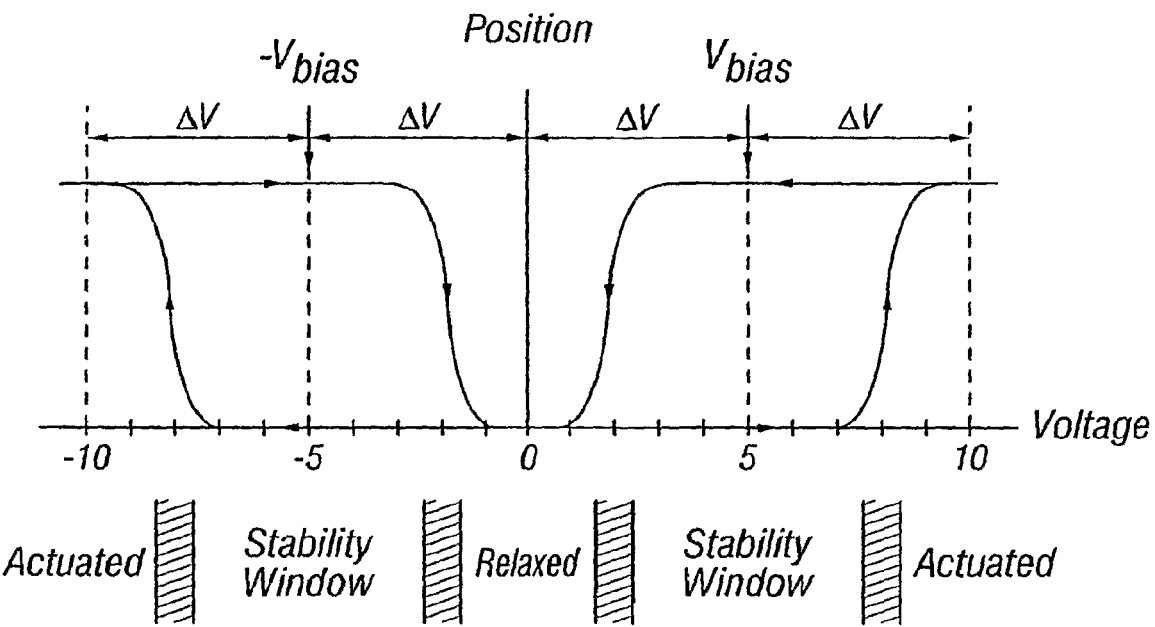
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
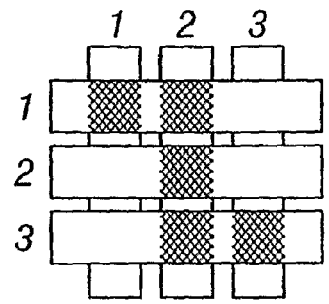
FIG. 5A illustrates one exemplary frame of display data in the 3×3 interferometric modulator display of FIG. 2.
Figure 5B:
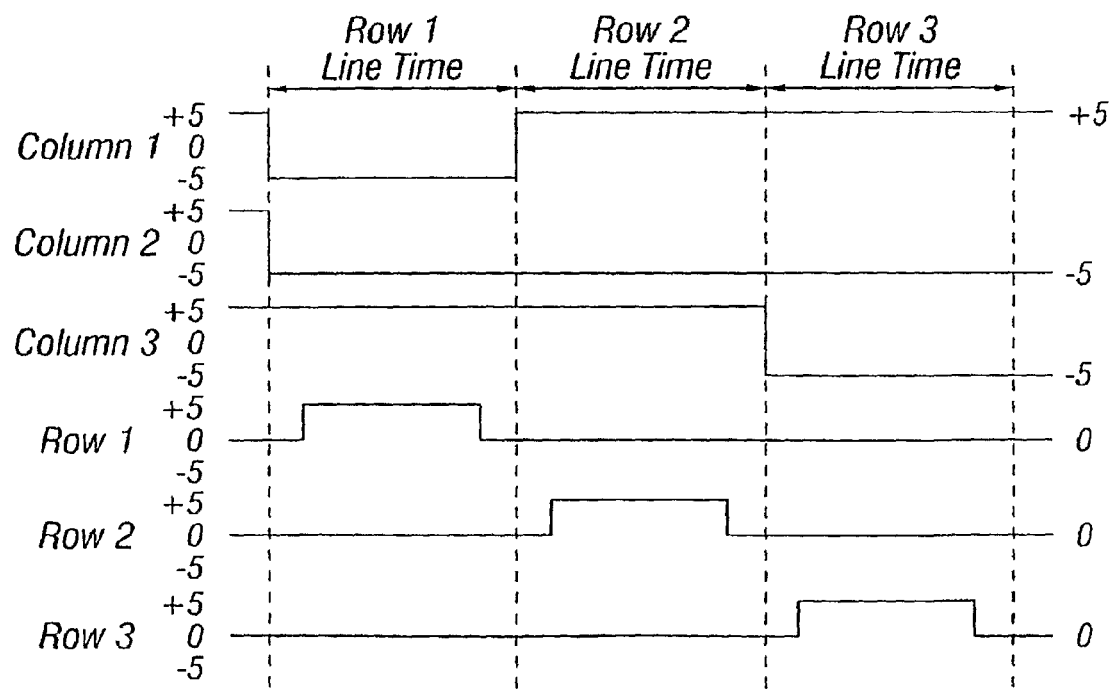
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to, $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
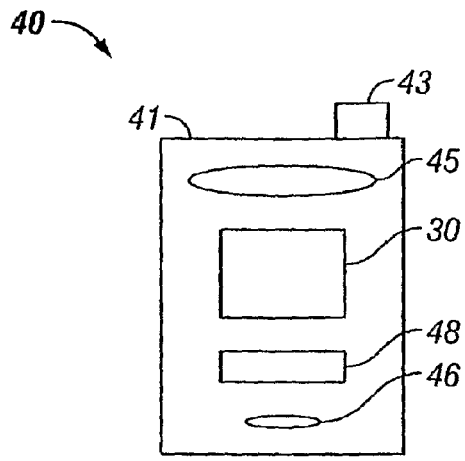
FIGS. 6A and 6B are system block diagrams illustrating an embodiment of a visual display device comprising a plurality of interferometric modulators.
Figure 6B:
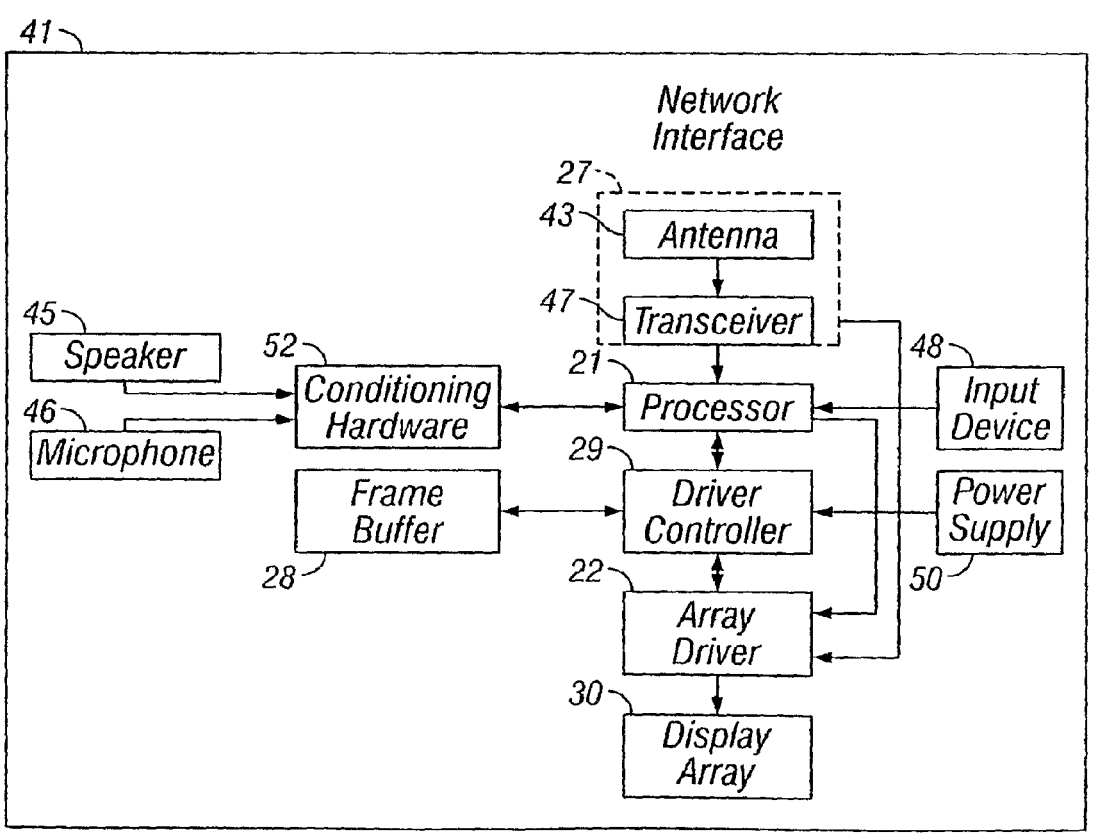

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming From the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
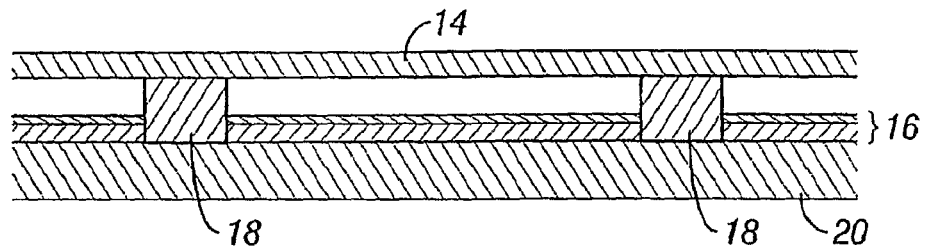
FIG. 7A is a cross section of the device of FIG. 1.
Figure 7B:
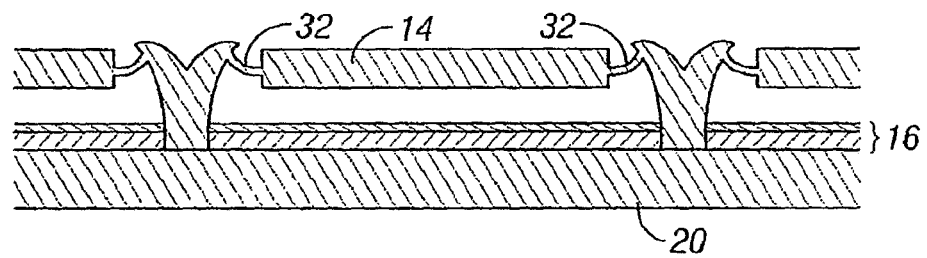
FIG. 7B is a cross section of an alternative embodiment of an interferometric modulator.
Figure 7C:
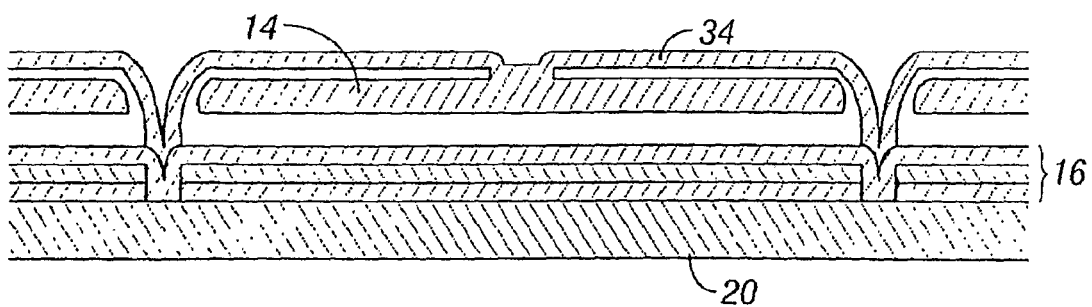
FIG. 7C is a cross section of another alternative embodiment of an interferometric modulator.
Figure 7D:
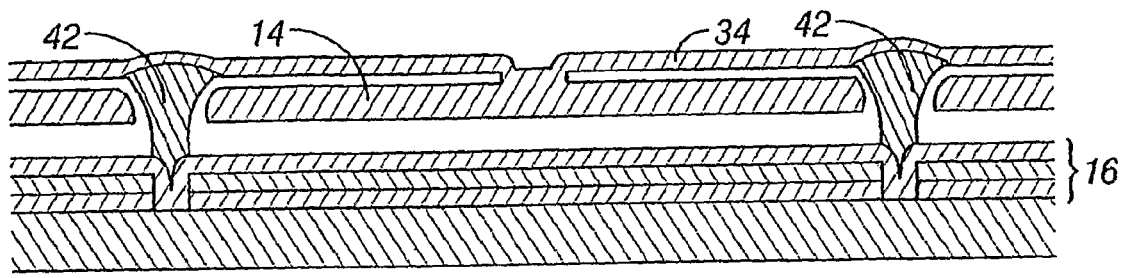
FIG. 7D is a cross section of yet another alternative embodiment of an interferometric modulator.
Figure 7E:
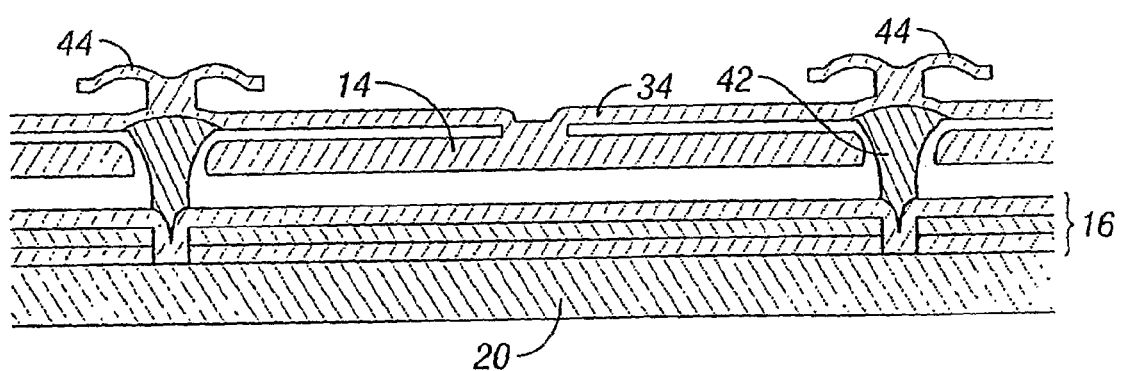
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and it's supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As described above, the interferometric modulators are reflective and rely on ambient lighting in daylight or well-lit environments. In addition, an internal source of illumination is often provided for illumination of interferometric modulators in dark ambient environments. The illumination source for interferometric modulator displays may, for example, comprise a front light that uses a light guide to collect light through a narrow rectangular edge of the light guide and redirect it towards the interferometric modulators, preferably spreading light uniformly across the array of display elements. In certain embodiments, the light guide may comprise a plastic or glass slab, sheet, or plate that is then disposed in front of the interferometric modulators. A turning layer may be laminated to or deposited on the slab or sheet to redirect light propagating along the light guide toward the display elements. In various designs, such light guides comprise a slab of plastic approximately 1 mm thick. However, for certain applications, the light guide should have a reduced or minimal thickness, for example, of less than about one-half a millimeter, to keep the overall display device thin.

One way to reduce or minimize the overall thickness of the display is to incorporate the turning layer on a structural component of the interferometric modulators, such as the substrate on which the interferometric modulators are formed. This substrate may comprise glass. Alternatively the substrate may comprise plastic or another substantially optically transmissive material. By depositing the turning layer on a structural component of the interferometric modulators, such as the glass substrate, the light from the artificial light source can be coupled into the glass substrate layer of the interferometric modulators and turned toward the interferometric modulators by the turning layer. The separate glass or plastic slab or sheet is no longer necessary and thus the thickness of the overall display device can be significantly reduced. In certain embodiments, one or more additional optical layers, such as a diffuser or an optical isolation layer may also be disposed on the substrate of the interferometric modulators to enhance the efficiency of the light guiding portion of the display or to otherwise improve the optical performance of the display. For example, a diffuser layer may be provided to scatter light incident on the interferometric modulators providing more uniform light to the interferometric modulators and thereby reducing or minimizing bright spots. A diffuser can also provide a more diffuse look to the display which may otherwise be too mirror-like. Alternatively or in addition, an optical isolation layer may be provided between the light guiding portion of the display and the interferometric modulators to prevent the interferometric modulators from absorbing light propagating through the light guiding portion. As described herein, the geometric arrangement of the turning layer and additional optical films on the substrate relative to the interferometric modulator may be selected to further enhance the optical performance of the overall display.

The display device may be formed using any of a variety of manufacturing processes known to those skilled in the art to adhere one or more of the optical layers described herein on the glass or plastic substrate of the array of display elements. The glass or plastic substrate comprises a support layer upon which the display elements, such as an array of interferometric modulators, are fabricated. As disclosed herein, the substrate may be further used to support one or more optical layers of the display device. In one embodiment, a turning layer may be deposited or laminated to the substrate. For example, the turning layer may be laminated to a top surface of substrate using a pressure sensitive adhesive. Alternatively, the turning layer may be deposited on the substrate using techniques known in the art or other techniques yet to be developed. The turning layer may be disposed on the opposite surface of the substrate from the array of display elements or alternatively, the turning surface may be disposed in between the glass substrate and the array of display elements. A diffuser may also be adhered to the glass substrate at any one of several locations relative to the array of display elements and the turning layer. For example, in certain embodiments the diffuser may be disposed on the substrate, with the diffuser being between the array of display elements and the substrate. Alternatively, the diffuser may be disposed between the turning layer and the substrate. The diffuser may be coated, deposited or laminated or etched on the substrate using any suitable techniques known in the art or yet to be developed. For example, the diffuser may be spin cast, or alternatively the diffuser may comprise a thin film grown directly on the surface of the substrate. In some embodiments the diffuser comprises adhesive with particulates therein for scattering, for example a pressure-sensitive adhesive with diffusing features, used to laminate the turning layer to the substrate, while in other embodiments it may be a volume diffuser sheet laminated to the substrate. In certain embodiments, an optical isolation layer may be disposed between the glass substrate and the array of display elements. For example, the optical isolation layer may be laminated or deposited on the surface of the substrate between the glass substrate and the array of display elements or alternatively between the glass substrate and the diffuser. Moreover, a wide variety of variation is possible. Films, layers, components, and/or elements may be added, removed, or rearranged. Additionally, processing steps may be added, removed, or reordered. Also, although the terms film and layer have been used herein, such terms as used herein include film stacks and multilayers. Such film stacks and multilayers may be adhered to other structures using adhesive or may be formed on other structures using deposition techniques or in other manners. Thus, it is apparent that any one of several geometric arrangements of the multiple optical layers can be produced on the substrate of the display elements using known manufacturing techniques to provide a thin display device having certain desired optical characteristics.

Figure 8:
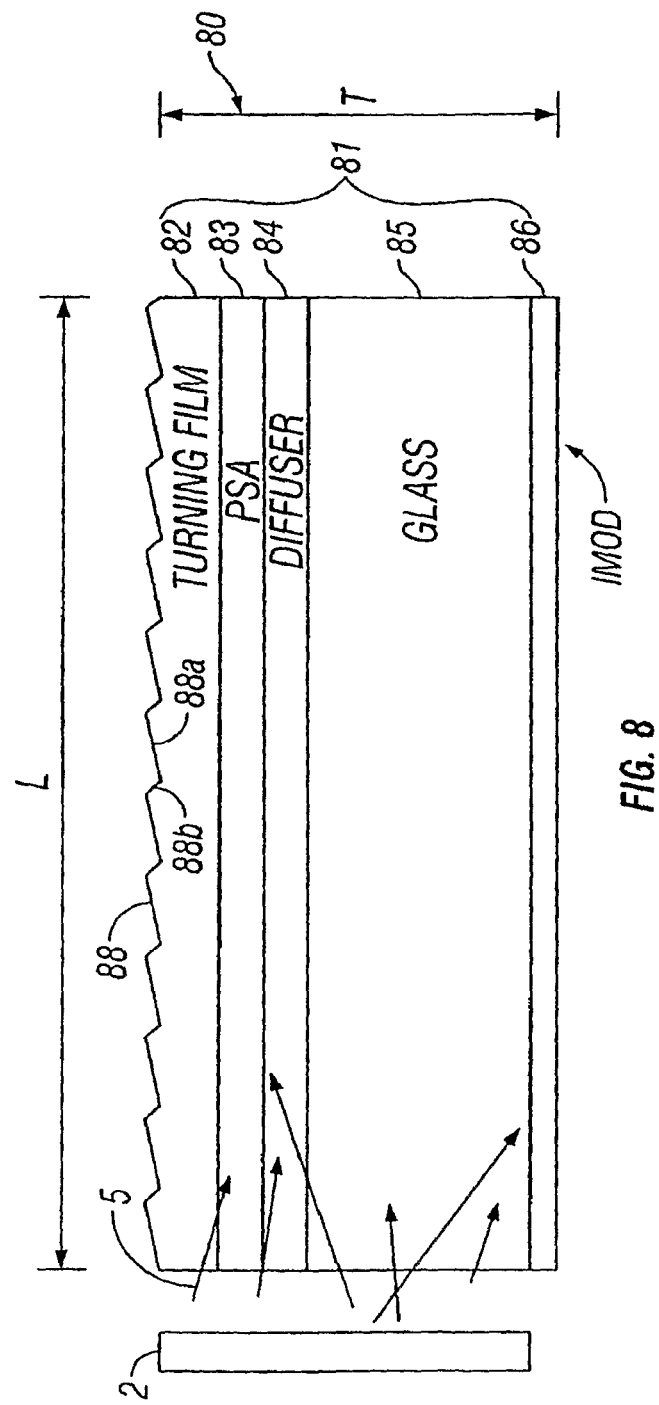
FIG. 8 is a cross section of a portion of a display device comprising a turning layer and a diffuser disposed on an opposite side of a substrate on which display elements are formed.

FIG. 8 illustrates one embodiment of a portion of a display device 80 in which a turning layer 82 is placed on the top surface of a glass substrate 85 for an array of display elements 86, for example a reflective display including an array of interferometric modulators (IMODs). Here, the light guiding portion 81 of the display device 80 comprises the turning layer 82, a pressure sensitive adhesive layer (PSA) 83, a diffuser 84 and the glass substrate 85 of the display elements 86. However, the overall thickness of the display device 80 due to the light guide is only increased by the addition of the turning layer and the pressure sensitive adhesive, since the glass substrate 85 is a structural component of the display elements 86 and the diffuser 84 is an element of the display device 80 used to address the specular nature of the display elements 86. The need for a separate glass or plastic slab or sheet for the light guide has been eliminated by adhering the turning layer 82 directly to the glass substrate 85 of the display elements 86. Consequently, the overall thickness of the display device 80 is only increased by the thickness of the turning layer 82, which is generally between about 100-300 microns, and the pressure sensitive adhesive 83, which is generally about 25-50 microns. There may be more layers than illustrated in the Figures, for example there may be a PSA (not shown) between the diffuser 84 and the glass 85 of FIG. 8.

A light injection system, not shown here, transforms light from a point source (e.g., a light emitting diode (LED)) into a line source. This light injection system may, for example, comprise a light bar. The light 5 from the linear light source 2 is injected in to an edge of the light guiding portion 81 of the display device 80. Thus, the light 5 is injected into the edge of the turning layer 82, the PSA layer 83, the diffuser 84 and the glass substrate 85. The light 5 is propagated along the length, L, of the light guiding portion 81 at least in part through total internal reflection due to the difference in index of refraction between the turning layer 82 and air. For example, the turning layer typically comprises a material such as polycarbonate, acrylics such as polymethylmethacrylate (PMMA), or acrylate copolymers such as poly(styrene-methylmethacrylate) polymers (PS-PMMA, sold under the name of Zylar), and other optically transparent plastics. The index of refraction of polycarbonate is approximately 1.59 and for Zylar is approximately 1.54 for wavelengths in the visible spectrum. Since the index of refraction is greater than that of air, which is 1.0, light incident on the turning layer/air interface at an angle greater than the critical angle will be reflected back into the light guiding portion and will continue to propagate along the length of the light guiding portion 81. The light may also reflect from the display elements 86 additionally supporting propagation of the light along the length of the light guide. The display elements 86, such as IMODs, may however, be absorbing and thus may absorb some of the light incident thereon as is discussed more fully below. In certain embodiments, the indices of refraction of the multiple optical layers comprising the light guiding portion 81, here the turning layer 82, the PSA 83, the diffuser 84 and the glass substrate 85, are advantageously close such that light may be transmitted through the multiple optical layers without being substantially reflected or refracted.

The turning layer 82 further comprises a plurality of turning features for turning light normally guided in the light guide 81 such that said light is redirected towards the display elements 86 and such that the propagation direction of said turned light forms an angle smaller than 45 degrees from the normal to the surface of the display elements. Accordingly, light is redirected through the thickness, T, of the light guiding portion 81 substantially normal to the light guide and the array of display elements 86 and is transmitted to the display elements 86 preferably at normal incidence. In certain embodiments, the turning features may comprise a plurality of surface features or volume features. In some embodiments, the turning layer 82 comprises diffractive optical elements extending across the length of the turning layer 82. In alternative embodiments, the turning layer 82 comprises holograms, such as holographic volume gratings, extending across the length of the turning layer 82. In one example, as illustrated in FIG. 8, the turning features may comprise a plurality of microprisms 88 extending along the length of the turning layer 82. The microprisms 88 may be configured to receive light 5 propagating along the length, L, of the turning layer 82 and turn the light 5 through a large angle, usually between about 70-90°. The prismatic microstructures 88 may comprise two or more turning facets 88a and 88b angled with respect to one another for reflecting the light at the air/facet interface via total internal reflection and causing the light to be turned toward the array of display elements 86 at near normal incidence thereto. The plurality of pairs of adjacent facets 88a and 88b may comprise, for example, one shallow, long facet and a much shorter but more steeply inclined facet. If light strikes the first, shallow facet 88a and then the second steeper facet 88b sequentially, total internal reflection occurs at both facet/air interfaces and the light is turned through a large angle. The light following this path is then transmitted through the thickness, T, of the light guiding portion 81 toward the display elements 86 where it may be modulated and reflected back through the light guiding portion 81 towards a viewer disposed in front of the display device 80 to provide an image on the display device 80.

Note that the size and separation of the turning features has been exaggerated for illustrative purposes. Other arrangement of facets can be used with varying tilt angles and lengths. Additionally, different shapes and configuration may be employed.

Figure 9:
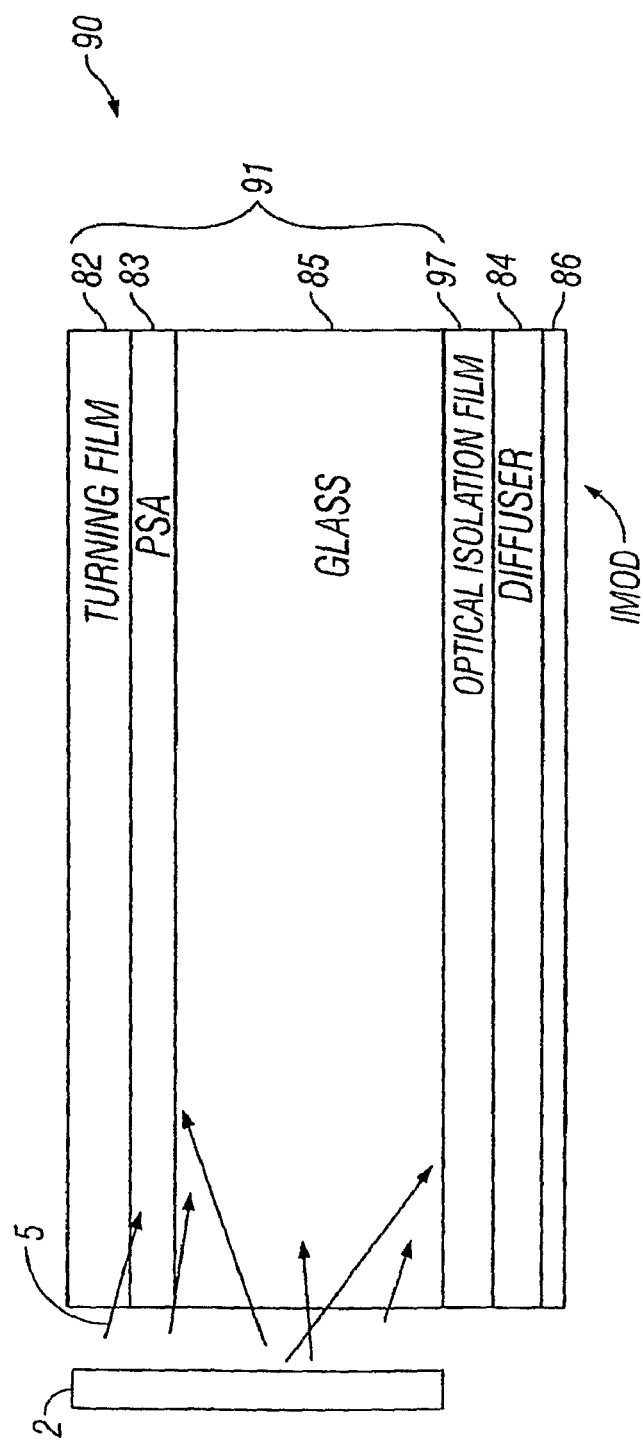
FIG. 9 is a cross section of a portion of an alternative embodiment of a display device comprising a turning layer on one side of a substrate and an optical isolation layer and a diffuser disposed on the opposite side of a substrate where the display elements are formed.

In an alternative embodiment, the turning features may comprise one or more diffractive optical elements configured to receive light normally guided in the light guide 81 and turn the light such that said light is redirected towards the display elements 86 and such that the propagation direction of said turned light forms an angle smaller than 45 degrees from the normal to the surface of the display elements 86. Alternatively, the turning features may comprise one or more holograms (e.g., volume holograms) configured to receive light normally guided in the light guide 81 and turn the light such that said light is redirected towards the display elements 86 and such that the propagation direction of said turned light forms an angle smaller than 45 degrees from the normal to the surface of the display elements. For example, as shown in FIG. 9, which is discussed more fully below, a holographic turning layer 82 with a flat-surface layer may be used. As described above, the light is preferably directed at normal or near normal incidence to the display elements 86.

Referring back to FIG. 8, the light guiding portion 81 further comprises a pressure sensitive adhesive (PSA) layer 83 and a diffuser 84. The PSA layer 83 is used to adhere the turning layer 82 to the diffuser layer 84 and glass substrate 85. The PSA layer 83 is preferably transparent with an index of refraction of between about 1.47-1.53 such that the index of refraction matches the index of refraction of glass substrate 85, generally about 1.52 for wavelengths in the visible spectrum. For example, in certain embodiments, the index of refraction of the PSA layer 83 is about 1.53. As discussed above, matching the indices of refraction of the PSA layer 83 and the glass substrate 85 is advantageous in preventing unwanted reflections at the interface between the PSA layer 83 and the glass substrate 85 for light rays originating from the ambient or from the light source of the light guide. Such unwanted reflections may prevent guided light inside the glass from entering the turning layer 82 at the critical angle and being turned towards the display elements 86.

In an alternative embodiment, the PSA layer 83 and the diffuser 84 may be merged into a single optical layer. For example, the PSA/diffuser layer may comprise a transparent adhesive with light diffusing filler material interspersed therein to provide the light diffusing characteristics. This design may further decrease the thickness of the overall display device 80 by removing the need for a separate diffuser layer 84, which may be between about 25-100 microns thick in some embodiments.

Figure 8A:
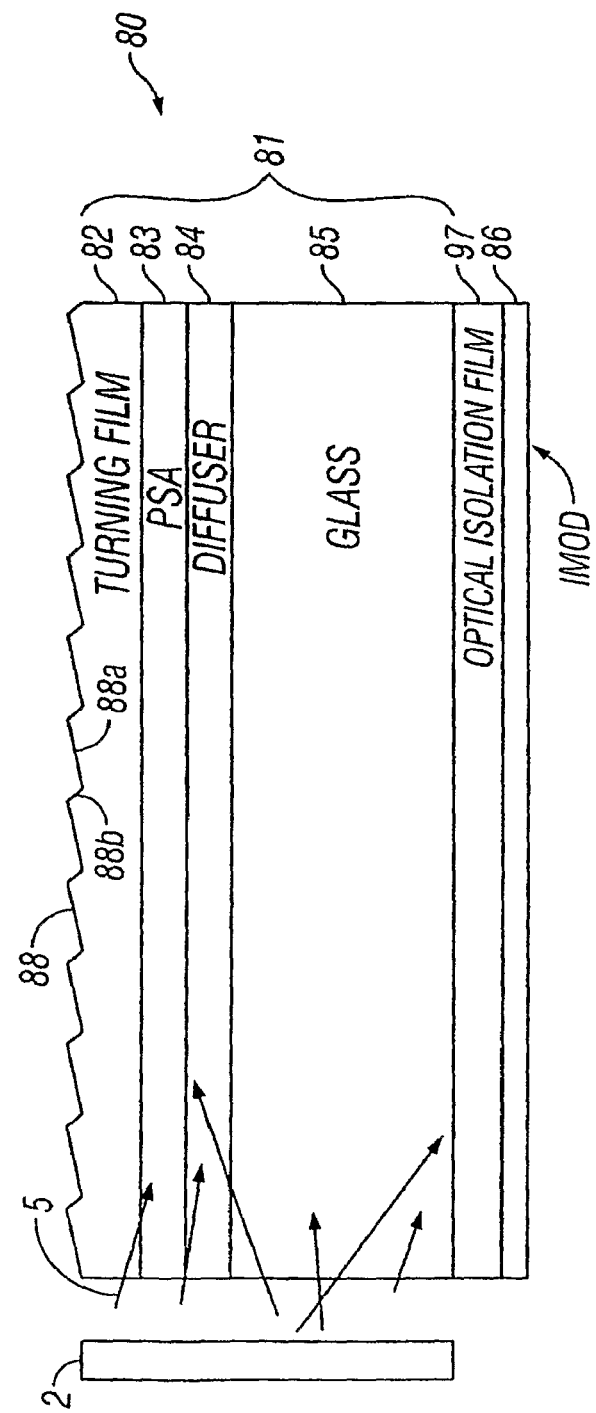
FIG. 8A is a cross section of a portion of an alternative embodiment of a display device comprising a turning layer and a diffuser on one side of a substrate and an optical isolation layer disposed on the opposite side of the substrate where the display elements are formed.

In an alternative embodiment, as depicted in FIG. 8A, the display device may further comprise an optical isolation layer disposed between the glass substrate 85 and the array of display elements 86. In some embodiments the display elements 86 may be absorptive structures, for light rays guided at an angle of 45-90 degrees measured from the normal to the display elements. Thus, some of the light propagating through the light guiding portion 81 and incident on the display elements 86 at an oblique angle may be substantially absorbed by the display elements 86 after a sufficient number of reflections. In order to reduce, minimize, or prevent this loss of light due to absorption, an optical isolation layer 97 may be disposed between the glass substrate 85 and the display elements 86. The optical isolation layer 97, as discussed in more detail below, advantageously has an index of refraction substantially lower than the glass substrate 85, such that light traveling through the light guiding portion 81 and striking the glass/optical isolation film interface at an oblique or grazing angle, for example, greater than the critical angle (e.g., greater than 60° or 80°), will be totally internally reflected back into the light guiding portion 81 of the display device 80. However, light propagating through the light guiding portion 81 at steep angles (closer to the display elements' normal), such as light turned substantially normal to the light guiding portion 81 by the turning layer 82, or ambient light, will be transmitted through the glass/optical isolation film interface. This normally incident light or near normally incident light preferably looses less than about 0.5% of its power or flux, and more preferably looses less than about 0.1% of its power or flux. Thus the optical isolation layer 97 forms a boundary for the light guiding portion 81 such that the light propagating through the light guiding portion 81 at oblique or grazing angles prior to being turned by the turning layer 82 may reflect back into, and continue to propagate through the light guiding portion 81 until it is turned toward the display elements 86 by the turning features of the turning layer 82, thereby providing a more illuminated display device.

As discussed above, for example, with reference to FIG. 8, the light guiding portion 81 comprises the turning layer 82, glass substrate 85, and a diffuser 84. Here, due to the arrangement of the optical stack in the display device 80 such that the diffuser layer 84 is part of the light guiding portion 81, some of the light 5 propagating through the light guiding portion 81 that should be reflected within the light guiding portion 81 via total internal reflection may be scattered by the diffuser 84 and therefore lost. In addition, the display elements 86 may be absorptive. Thus, some of the light propagating through the light guiding portion and incident on the display elements at an oblique angle may be absorbed by the display elements 86. Furthermore, the diffuser layer 84 may compound the loss to the display elements 86 by directing some of the light propagating through the light guiding portion 81 towards the oblique angles that are absorbed by the display elements 86. As such, some light propagating through the light guiding portion 81 is lost when it could more advantageously be internally reflected to provide more light to display elements 86 at the distal end of the display device 80.

To reduce this loss in the light guided by total internal reflection in the light guiding portion 81 as described above, it may be advantageous in certain embodiments to use an anisotropic diffuser. The anisotropic diffuser may have stronger diffusing ability to light traveling substantially normal to the surface of the substrate reflected from the display elements compared to the light guided within the light guiding portion 81 via total internal reflection and compared to light normally incident on the display elements. The anisotropic diffuser may be implemented in a variety of ways. For example, in some embodiments, the anisotropic diffuser may be formed by disposing non-spherical particles inside a PSA matrix. In other embodiments, the anisotropic diffuser may be implemented by forming one or more holograms such as holographic diffusers, for example, volume holographics based on diffractive optics. The anisotropic diffuser may diffuse light reflected from the array of display elements at normal or near normal incidence. The anisotropic diffuser, however, may substantially reduce the loss for light guided within the light guiding portion 81. The diffuser may have also be less diffusing for ambient light directed at normal incidence onto the substrate and the display elements, thereby illuminating a portable reflective display like an array of IMODs.

In certain other embodiments, to reduce the loss due to the presence of a diffuser present inside the light guiding path it may be advantageous to use a diffuser that can be electrically switched on. The diffuser may be switched on when the supplementary light source is on and the diffuser may be switched off when the supplementary artificial light source (e.g., LED light source) is off. When a display is viewed under ambient light the supplementary light source may not be used, however, a diffuser may be helpful for viewing the display clearly when the viewer is not positioned in the specular reflecting angle of the ambient illumination. Thus, the diffuser may be electrically switched on when the display is viewed under ambient light and the supplementary light source is not being used.

When the display is used, for example, in dark ambient conditions, the supplementary illumination may be turned on. The viewability of the display will likely not be affected by a reduction in diffusing properties of the diffuser when the display is viewed within the viewing cone of the supplementary light source. Thus in such cases the supplementary light source may be turned on while the diffuser may be turned off. An electrically switchable diffuser may be implemented, for example, by polymer dispersed liquid crystal or other electro-optical material and/or configuration. A hologram for example may comprise polymer dispersed liquid crystal and be switched by applying a voltage thereto. Electrodes (e.g., substantially optically transmissive or transparent electrodes) may be disposed with respect to the diffuser layer to apply the electrical signal.

In another embodiment, the optical layers comprising the display device may be arranged such that the diffuser layer is optically decoupled from the light guiding portion. One way to increase the internal reflection of light propagating at oblique angles is to create an air gap between the diffuser and the light guide. However, this configuration requires a separate substrate for the turning layer which thereby increases the thickness of the display device. Alternatively, as shown in FIG. 9, an optical isolation layer 97 may be provided between the light guiding portion 91 of the display device 90 and the diffuser 84 to optically isolate the light guiding portion 91 from the diffuser 84 and the display elements 86.

With reference to FIG. 9, the display device 90 comprises a turning layer 82 laminated or otherwise disposed on the glass substrate 85, an optical isolation layer 97 and a diffuser 84 disposed between the glass substrate 85 and the display elements 86. The light guiding portion 91 of the display device comprises the turning layer 82 and the glass substrate 85.

Light 5, for example, from a linear light source 2 is injected into the edges of the turning layer 82 and the glass substrate 85. As discussed above, the light is propagated along the length, L, of the light guiding portion 91 through total internal reflection. For example, when the light 5 strikes the air/turning layer interface at an angle greater than the critical angle, the light is totally internally reflected at oblique angles such that it remains propagating along the length of the light guiding portion 91. In addition, when the light 5 strikes the glass substrate/optical isolation layer interface at an angle greater than the critical angle, the light is totally internally reflected at oblique angles such that it remains propagating along the length of the light guiding portion 91. As the light propagates along the length of the light guiding portion 91, portions of the light are redirected towards the display elements 86 by the turning features such that the propagation direction of said turned light forms an angle smaller than 45 degrees from the normal to the surface of the display elements 86.

Additionally, the optical isolation layer 97 substantially reduces the guided light from being scattered by the diffuser 84 and/or absorbed by the display elements 86 as it propagates along the length of the light guiding portion. As illustrated, this optical isolation layer 97 is disposed between the light guiding portion 91 and the diffuser 84 and display elements 86. Thus, light propagating through the light guiding portion 91 at oblique angles is not incident on an adjacent diffuser 84 or display elements 86. Rather the light may reflect back into, and continue to propagate through the light guiding portion 91 until it is turned toward the display elements 86 by the turning features of the turning layer 82, thereby providing a more illuminated and more uniform display device 80.

Accordingly, the optical isolation film 97 is configured such that light propagating through the light guiding portion 91 at oblique angles does not interact with the diffuser 84 and display elements 86, but also such that light propagating through the light guiding portion 91 at steep angles normal to the glass substrate and/or array of display elements 86 (e.g., due to being turned towards the array of display elements 86 by the turning layer 82 or from the ambient light) may interact with the diffuser 84 and the array of display elements 86.

In one example embodiment, the optical isolation film may comprise a low index layer, such as silicon dioxide which has an index of refraction of approximately 1.46, fluorinated $SiO_2$ with index of refraction of approximately 1.4 or fluoropolymers (e.g., amorphous fluoropolymers such as DuPont NC-211) having good adhesion to glass and plastics and indices of refraction between about 1.3 and 1.4, and any other suitable material with an index of refraction substantially lower than the index of refraction of the glass substrate layer 85, generally about 1.52 at visible wavelengths. By providing an optical isolation layer 97 with an index of refraction substantially lower than the glass substrate 85, light traveling through the light guiding portion 91 and striking the glass/optical isolation film interface at an oblique angle, greater than the critical angle (e.g., greater than about 60° or 80°), will be totally internally reflected back into the light guiding portion 91 of the display device 90. In contrast, light propagating through the light guiding portion 91 at steep angles (e.g., less than 20°, 10°, or 5°), such as light turned substantially normal to the light guiding portion 91 by the turning layer 82 or ambient light, is transmitted through the glass/optical isolation film interface and loses less than about 0.5% of its intensity in certain embodiments, and more preferably loses less than about 0.1% of its intensity in other embodiments. Values outside these ranges, however, are also possible.

In an alternative embodiment, the optical isolation layer 97 may comprise a dielectric thin film stack configured to cause interference such that the light propagating through the light guiding portion 91 does not penetrate into the diffuser 84 or display elements 86. For example, the optical isolation film 97 may comprise an interference stack of alternating optical layers having high and low indices of refraction, such that the oblique light from the light guiding portion 91 is effectively prevented from being transmitted therethrough yet normal incident light is transmitted therethrough. The design and fabrication of multilayer interference filters is well known in the art.

Figure 10:
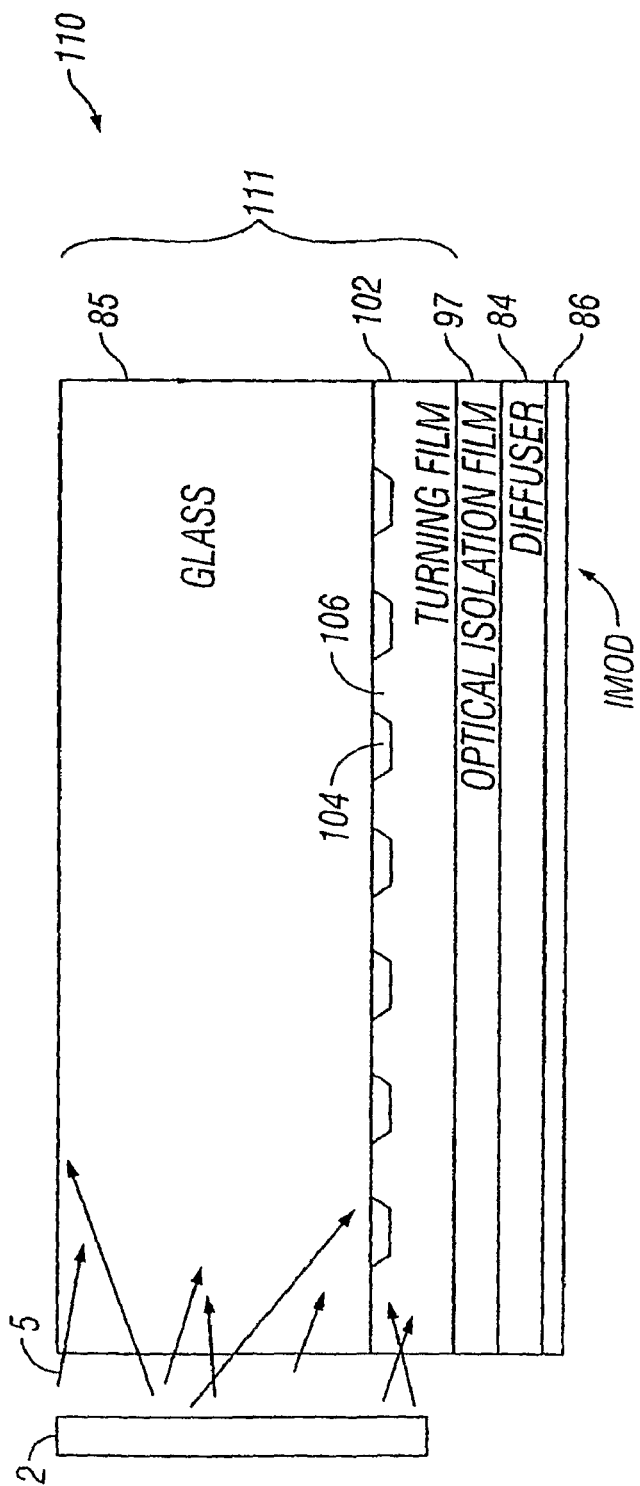
FIG. 10 is a cross section of a portion of an embodiment of a display device comprising a turning layer, an optical isolation layer and a diffuser disposed the same side of a substrate on which display elements are formed.

In an alternative embodiment, as depicted in FIG. 10, the turning layer 102 may be disposed below and in particular on the bottom surface of the glass substrate 85, such that the turning layer 102 is located in between the glass substrate 85 and the display elements 86. The display device 110 may further comprise a diffuser 84 disposed in between the turning layer 102 and the display elements 86. Additionally, the display device 110 may include an optical isolation layer 97 to optically decouple the light guiding portion 111 from the optical loss layers, e.g. the diffuser 84 and the display elements 86.

Here, the light guiding portion 111 comprises the turning layer 102 and the glass substrate 85. Light 5 from a linear light source 2 is injected into the edges of the turning layer 102 and the glass substrate 85. As discussed above, the light 5 is propagated through the light guiding portion 111 via total internal reflection. Here, the glass substrate 85 has a higher index of refraction, typically about 1.52 for light in the visible spectrum, than air which is 1.0, such that light striking the glass/air interface at an oblique angle greater than the critical angle will be totally internally reflected back into the light guiding portion 111, similar to as described above with respect to light striking the turning layer/air interface. The turning layer 102 also has a higher index of refraction than the optical isolation layer 97 and the glass substrate, such that light striking the turning layer/optical isolation layer interface at an oblique angle greater than the critical angle will be totally internally reflected back into the light guiding portion 111. The light 5 will then continue to propagate along the length of the light guiding portion 111 until it is turned towards the display elements 86 by the turning features of the turning layer 102. As discussed above, the turning layer 102 comprises a plurality of turning features, such as surface relief or volume features, features forming one or more diffractive optical elements or holograms (e.g., holographic volume gratings) extending along the film, that are configured to redirect incident light over a large angle such that the propagation direction of said redirected light forms an angle smaller than 45 degrees from the normal to the surface of the display elements 86.

For example, as shown in FIG. 10, the turning layer 102 comprises a plurality of microprisms 106 extending along the surface of the turning layer 102. When the contoured surface of the turning layer 102 is disposed on the planar surface of the glass substrate 85, a plurality of air pockets 104 are embedded therebetween. In use, light striking an interface between one of the facets of the microprisms 106 and the embedded air pocket 104 will undergo total internal reflection at that interface and thereby be redirected though a large angle, such that the propagation direction of said redirected light forms an angle smaller than 45 degrees from the normal to the surface of the display elements. The shape and size of the microprisms 106, and thus the resulting air pockets 104, may also be chosen to provide the optimum or desired turning angle. In other embodiments holographic light turning elements or other light turning means based on diffractive optics can be used.

As described above, the display device 110 further comprises the optical isolation film 97 disposed between the turning layer 102 and the diffuser 84 and display elements 86. The optical isolation layer 97 provides a lower boundary for the light guiding portion 111 of the display device 110 by totally internally reflecting light propagating through the light guide at oblique angles back into the light guiding portion 111 at the turning layer/optical isolation film interface. For example, as discussed above, the optical isolation film 97 may comprise an optical film, such as silicon dioxide or fluorinated $SiO_2$, that has an index of refraction substantially lower than the index of refraction of the turning layer 102, typically about 1.54-1.59 at visible wavelengths. Thus, light incident on the turning layer/optical isolation film interface at an oblique angle greater than the critical angle will be reflected back into the light guiding portion 111 and will not be transmitted through to the diffuser 84 or the display elements 86 where it would be scattered and/or absorbed. However, light incident on the turning layer/optical isolation film interface at a steep (more normal) angle, such as light turned towards the display elements 86 by the turning layer or ambient light, will be transmitted through the interface towards the display elements 86 where it will be modulated and reflected back through the optical layers of the display device 110 to create an image on the display device.

As discussed above, since the turning layer 102 is disposed directly on the glass substrate 85 of the spatial light modulator 86 in the embodiment shown, the overall thickness of the display device is reduced or minimized. Here, the glass substrate, generally about 700 microns thick or less is a structural component of the display elements 86. Thus, the light guiding portion 111 of the display only increases the total thickness of the display device 80 by the thickness of the turning layer 102, generally about 100-300 microns thick, and the optical isolation film 97, generally about 1000 nanometers thick. Thus, the total thickness of the display device 111 may be maintained relatively thin.

A wide variety of alternative configurations are possible. For example, components (e.g., layers) may be added, removed, or rearranged. Similarly, processing and method steps may be added, removed, or reordered. Also, although the terms film and layer have been used herein, such terms as used herein include film stacks and multilayers. Such film stacks and multilayers may be adhered to other structures using adhesive or may be formed on other structures using deposition or in other manners.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A display device comprising:
   a substrate having front and rear sides and a plurality of edges between the front and rear sides;
   a plurality of display elements on the rear side of the substrate and supported by the substrate;
   a plurality of turning features on the front side of the substrate; a diffuser on the front side of the substrate between the turning features and the substrate; and
   a light source configured to inject light into the substrate through at least one edge of the substrate.

2. The display device of claim 1, wherein the substrate includes glass or plastic.

3. The display device of claim 1, wherein the plurality of display elements includes interferometric modulators.

4. The display device of claim 1, wherein the plurality of turning features is disposed in a film on the front side of the substrate.

5. The display device of claim 1, wherein the diffuser includes adhesive with particulates therein.

6. The display device of claim 1, wherein the diffuser includes an anisotropic diffuser.

7. The display device of claim 6, wherein the diffuser includes one or more volume holograms.

8. The display device of claim 1, wherein the diffuser can be electrically controlled.

9. The display device of claim 8, wherein the diffuser includes polymer dispersed liquid crystal.

10. The display device of claim 1, further comprising an optical isolation layer between the substrate and the display elements.

11. The display device of claim 10, wherein the optical isolation layer is directly adjacent the substrate.

12. The display device of claim 1, wherein the diffuser is directly adjacent the substrate or directly adhered to the substrate with an adhesive.

13. The display device of claim 1, wherein the turning features are included in a film directly adjacent the diffuser or directly adhered to the diffuser with an adhesive.

14. The display device of claim 1 further comprising:
    a processor that is in electrical communication with at least one of the plurality of display elements, the processor being configured to process image data; and a memory device in electrical communication with the processor.

15. The display device of claim 14, further comprising:
    a driver circuit configured to send at least one signal to the at least one of the plurality of display elements.

16. The display device of claim 15, further comprising:
    a controller configured to send at least a portion of the image data to the driver circuit.

17. The display device of claim 14, further comprising:
    an image source module configured to send the image data to the processor.

18. The display device of claim 17, wherein the image source module includes at least one of a receiver, transceiver, and transmitter.

19. The display device of claim 14, further comprising:
an input device configured to receive input data and to communicate the input data to the processor.

20. The display device of claim 1, wherein the light is reflected by the turning features toward the plurality of display elements.

21. A display device comprising:
a substrate having front and rear sides and a plurality of edges between the front and rear sides;
a plurality of display elements on the rear side of the substrate, wherein the plurality of display elements is supported by the substrate;
a plurality of turning features on the front side of the substrate;
a diffuser between the substrate and the plurality of display elements; and
a light source configured to inject light into the substrate through at least one edge of the substrate.

22. A display device comprising:
a substrate having front and rear sides;
a plurality of display elements on the rear side of the substrate, the plurality of display elements being supported by the substrate;
a plurality of turning features on the rear side of the substrate between the substrate and the plurality of display elements;
a diffuser on the rear side of the substrate between the turning features and the plurality of display elements, and a light source configured to inject light into the substrate through at least one edge of the substrate.

23. A display device comprising:
a substrate having front and rear sides;
a plurality of display elements on the rear side of the substrate;
a plurality of turning features on the rear side of the substrate between the substrate and the plurality of display elements;
an optical isolation layer on the rear side of the substrate between the turning features and the plurality of display elements, and
a light source configured to inject light into the substrate through at least one edge of the substrate.

* * * * *